United States Patent [19]

Dyksterhouse et al.

[11] Patent Number: 4,894,105
[45] Date of Patent: Jan. 16, 1990

[54] PRODUCTION OF IMPROVED PREIMPREGNATED MATERIAL COMPRISING A PARTICULATE THERMOPLASTIC POLYMER SUITABLE FOR USE IN THE FORMATION OF SUBSTANTIALLY VOID-FREE FIBER-REINFORCED COMPOSITE ARTICLE

[75] Inventors: Robert Dyksterhouse; Joel Dyksterhouse, both of Marathon, Fla.

[73] Assignee: BASF Aktiengesellschaft, Fed. Rep. of Germany

[21] Appl. No.: 114,362

[22] Filed: Nov. 4, 1987

Related U.S. Application Data

[63] Continuation-in-part of Ser. No. 928,917, Nov. 7, 1986, abandoned.

[51] Int. Cl.$^4$ .................. B29B 15/12; C08J 5/00; B29C 67/14
[52] U.S. Cl. .................. 156/181; 156/166; 156/180; 264/136; 427/212; 427/221
[58] Field of Search .................. 156/181, 180, 166; 525/19, 438; 528/298; 428/251; 19/410, 48, 223, 225, 232, 125, 655; 526/238, 23; 264/136; 427/212, 220, 221

[56] References Cited

U.S. PATENT DOCUMENTS

| | | |
|---|---|---|
| 30,770 | 10/1981 | Shobert et al. . |
| 2,244,203 | 6/1941 | Kern . |
| 2,596,162 | 5/1952 | Muskat .................. 156/184 X |
| 2,609,319 | 9/1952 | Boge .................. 156/184 X |
| 2,790,208 | 4/1957 | Smith . |
| 2,843,881 | 7/1958 | Bishop et al. . |
| 2,919,862 | 1/1960 | Beike et al. . |
| 2,967,177 | 1/1961 | Warthen . |
| 3,032,829 | 5/1962 | Mahoney et al. . |
| 3,116,192 | 12/1963 | Eilerman . |
| 3,148,102 | 9/1964 | Eakins et al. . |
| 3,336,901 | 8/1967 | Dauchert . |
| 3,422,796 | 1/1969 | Baber . |
| 3,432,339 | 3/1969 | Howell et al. . |
| 3,452,400 | 7/1969 | Kane et al. . |
| 3,503,371 | 3/1970 | Meyers et al. . |
| 3,543,221 | 11/1970 | Schmier . |
| 3,544,421 | 12/1970 | Griffith . |
| 3,602,416 | 8/1971 | Basche et al. . |
| 3,657,040 | 4/1972 | Shobert . |
| 3,737,352 | 6/1973 | Avis et al. . |
| 3,779,854 | 12/1973 | Dukert et al. . |

(List continued on next page.)

FOREIGN PATENT DOCUMENTS

| | | |
|---|---|---|
| 588381 | 12/1959 | Canada . |
| 1267996 | 6/1961 | France . |
| WO8301755 | 5/1983 | PCT Int'l Appl. . |
| WO8603449 | 6/1986 | PCT Int'l Appl. . |
| 50-90775 | 7/1975 | Japan . |

(List continued on next page.)

Primary Examiner—Michael W. Ball
Assistant Examiner—Jeff H. Aftergut
Attorney, Agent, or Firm—Burns, Doane, Swecker & Mathis

[57] ABSTRACT

An improved multifilamentary fibrous material is formed having particles of a matrix-forming thermoplastic polymer substantially uniformly dispersed among adjoining filaments in the absence of fusion bonding. The polymer particles initially are dispersed in an aqueous medium containing an effective amount of a dissolved polymeric binding agent and the viscosity of the medium subsequently is substantially increased to at least 50,000 cps. to form a gelled impregnation bath having a plastic flow characteristic with shear-thinning behavior wherein the polymer particles are substantially uniformly suspended. The resulting impregnation bath is caused to flow between the adjoining filaments of the multifilamentary fibrous material with a concomitant viscosity reduction which aids in the incorporation of the polymer particles. The concentration of the aqueous medium in the product is controlled to yield a uniform, handleable, drapable, tacky, and highly stable product. Upon the application of heat and pressure the improved product can be transformed into a fiber-reinforced composite article wherein the solid particles form the matrix phase.

161 Claims, 12 Drawing Sheets

U.S. PATENT DOCUMENTS

| | | |
|---|---|---|
| 3,843,386 | 10/1974 | Ribbans . |
| 3,862,060 | 1/1975 | Anderson et al. . |
| 3,878,813 | 4/1975 | Roberson et al. . |
| 3,881,978 | 5/1975 | Livingston et al. . |
| 3,904,795 | 9/1975 | Mercurio . |
| 3,907,730 | 9/1975 | Jones .......................... 526/238.23 X |
| 3,930,097 | 12/1975 | Alberino et al. . |
| 3,939,024 | 1/1976 | Hoggatt . |
| 3,956,239 | 5/1976 | Komoto et al. . |
| 3,970,495 | 7/1976 | Ashton ................................ 156/162 |
| 4,001,024 | 1/1977 | Dittman et al. . |
| 4,067,845 | 1/1978 | Epel et al. . |
| 4,089,727 | 5/1978 | McLain . |
| 4,119,747 | 10/1978 | Veazcy . |
| 4,172,869 | 10/1979 | Oishi et al. . |
| 4,238,542 | 12/1980 | Burley . |
| 4,259,379 | 3/1981 | Britton et al. . |
| 4,268,473 | 5/1981 | Bower et al. . |
| 4,276,328 | 6/1981 | Bartram . |
| 4,290,939 | 9/1981 | Bertsch et al. . |
| 4,292,105 | 9/1981 | Taylor . |
| 4,299,950 | 11/1981 | Iwata et al. . |
| 4,302,485 | 11/1981 | Last et al. . |
| 4,340,076 | 7/1982 | Weitzen . |
| 4,363,680 | 12/1982 | Buck, Jr. et al. . |
| 4,439,387 | 3/1984 | Hawley . |
| 4,487,647 | 12/1984 | Semeghini et al. . |
| 4,495,017 | 1/1985 | Abe et al. . |
| 4,543,777 | 10/1985 | Zentner et al. . |
| 4,572,849 | 2/1986 | Koepke et al. . |
| 4,588,538 | 5/1986 | Chung et al. . |
| 4,622,192 | 11/1986 | Ma . |
| 4,624,885 | 11/1986 | Mumford et al. . |
| 4,626,306 | 12/1986 | Chabrier et al. . |
| 4,680,224 | 7/1987 | O'Connor . |

FOREIGN PATENT DOCUMENTS

| | | |
|---|---|---|
| 178811 | 8/1923 | United Kingdom . |
| 1264432 | 2/1972 | United Kingdom . |
| 1400852 | 7/1975 | United Kingdom . |
| 1424168 | 2/1976 | United Kingdom . |
| 1495845 | 12/1977 | United Kingdom . |

OTHER PUBLICATIONS

"Carpobol Water Soluble Resins", B. F. Goodrich, Cleveland, OH, May 1986.

"Stampable Carbon–Fiber–Reinforced Engineering Thermoplastic" by Gordon J. Taylor, A Presentation to the Society of Plastic Engineers, MINITEC, Neward, N.J., Mar. 6, 1981.

"Liquid-Crystal Polymers: In a Class of Their Own" published in *Mechanical Engineering* Mar. 1986, pp. 36–41.

"Super-performing Liquid Crystal Polymers Arrive", *Modern Plastics,* Apr. 1985.

"Composite Materials Technology", publication SP648 of the Society of Automotive Engineers, a compilation of papers presented at the International Congress and Exposition, Detroit, Michigan, Feb. 24–28, 1986.

Technical Data Sheets pertaining to Xydar, SRT–500, SRT–300 and FSR–315, "High Performance Engineering Resins".

Japanese Patents Gazette, Part I–Chemical, Week X06, 17 Mar. 1976, Derwent Publications Ltd., (London GB).

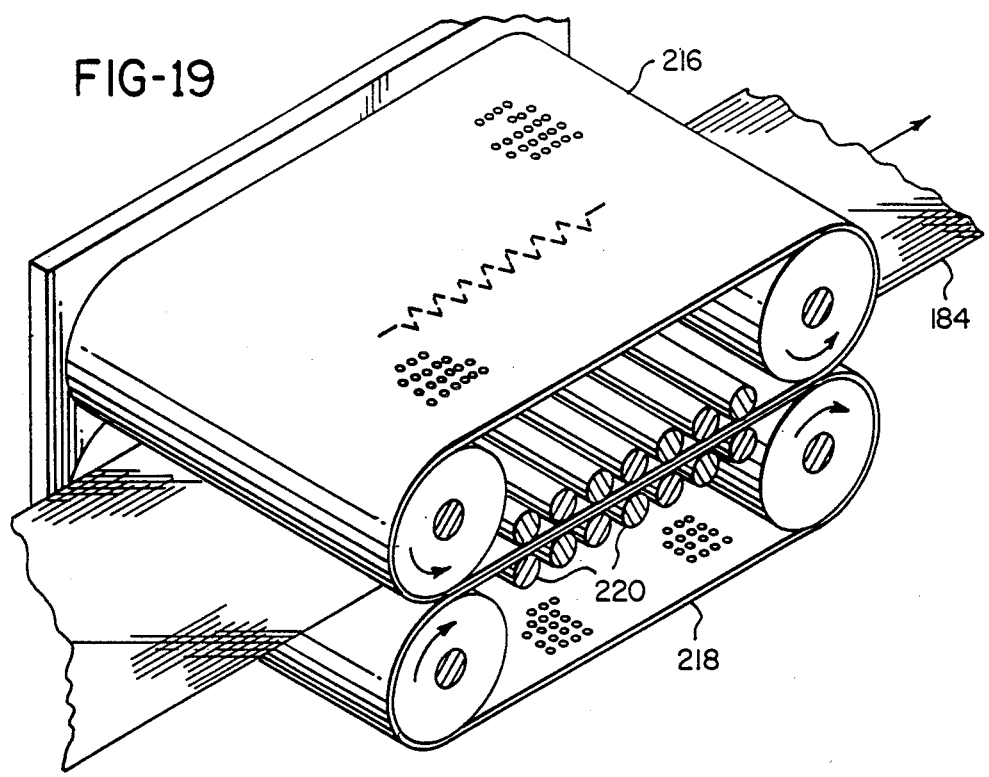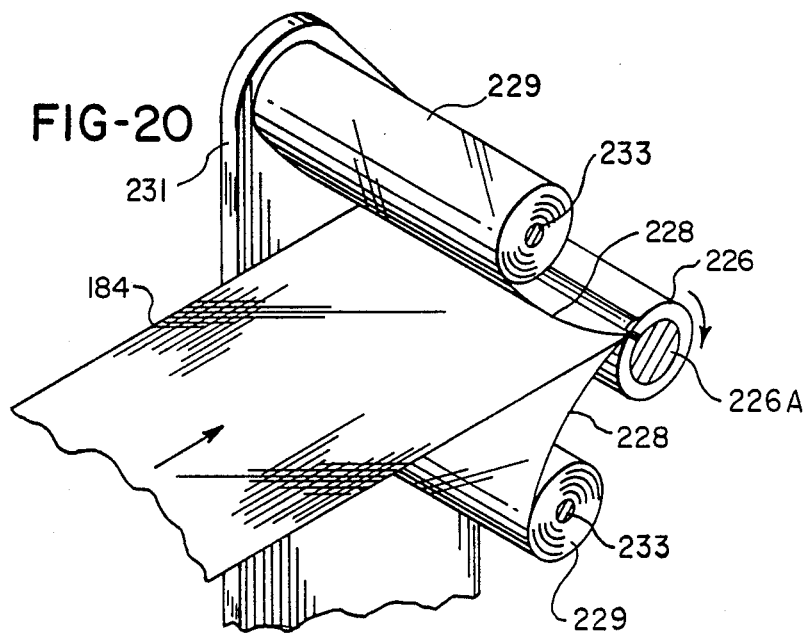

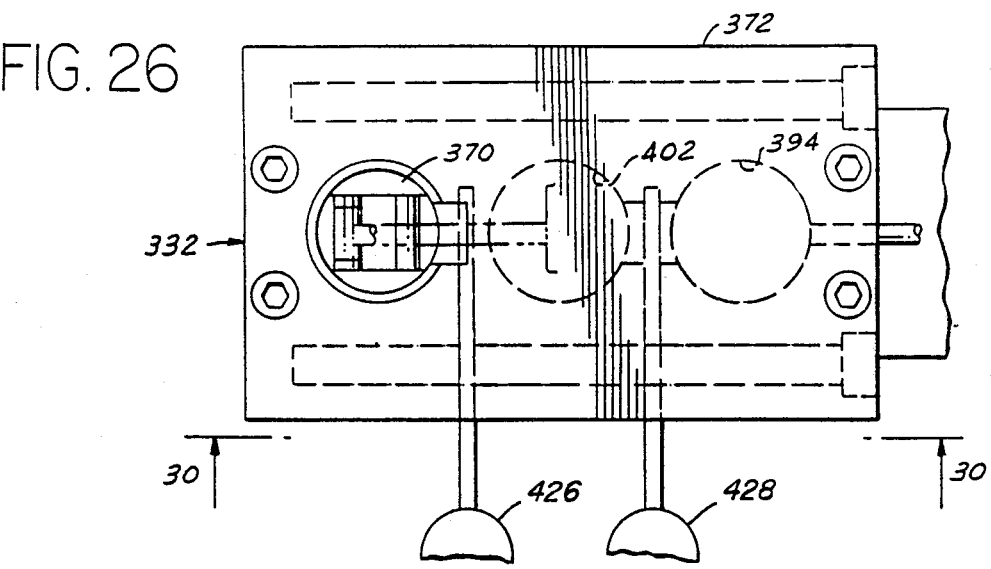
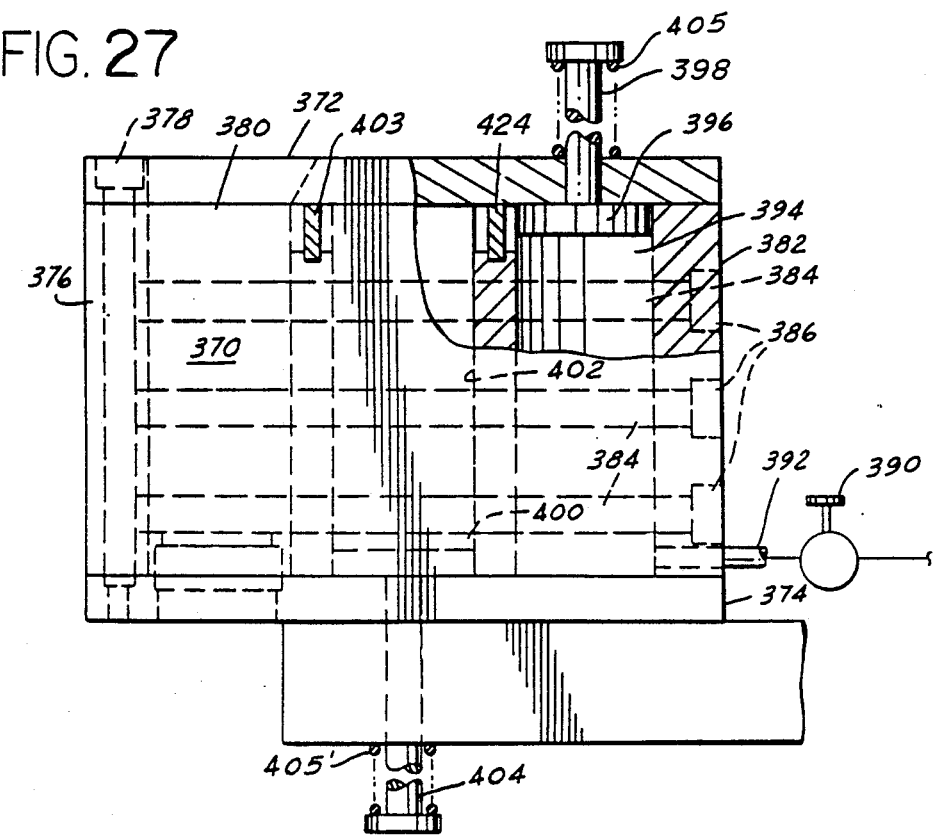

PRODUCTION OF IMPROVED PREIMPREGNATED MATERIAL COMPRISING A PARTICULATE THERMOPLASTIC POLYMER SUITABLE FOR USE IN THE FORMATION OF SUBSTANTIALLY VOID-FREE FIBER-REINFORCED COMPOSITE ARTICLE

CROSS REFERENCE TO RELATED APPLICATION

This is a continuation-in-part application of our U.S. Ser. No. 928,917, filed Nov. 7, 1986, entitled "Method and Apparatus for Impregnating the Tow to Form a Drapable Fibrous Material".

BACKGROUND OF THE INVENTION

Numerous techniques have been proposed in the past for the formation of composite articles wherein fiber reinforcement is provided within a matrix of a polymeric material. Heretofore such composite articles commonly have been prepared wherein the matrix is a highly cross-linked thermosetting resin. During the formation of such composite articles the fibrous material commonly is impregnated with a liquid comprising the neat or dissolved uncured or partially-cured thermosetting resin to form a pliable, tacky prepreg which is subsequently placed in the desired configuration and is cured to a predetermined solid form over an extended period of time. The drapable and tacky nature of such prepregs has greatly aided in their use when forming composite articles having a complex configuration since adjoining layers tend to adhere well to each other and stay in place during the composite formation procedure. However, the resulting composite articles which employ a thermosetting resin in the matrix phase commonly are somewhat brittle and are found to provide deficient mechanical properties for some end use applications where toughness is of importance.

Accordingly, discussions can be found in the technical literature concerning the desirability of forming fiber-reinforced composite articles wherein the matrix phase is a thermoplastic polymer which can be relied upon to impart different mechanical properties to the composite article. When attempts have been made to impregnate reinforcing fibers with a molten thermoplastic polymer, it commonly is found that the melt viscosity of the polymer is too great to enable uniform impregnation between adjoining fibers. Also, when the melt is allowed to cool the resulting article is stiff and boardy and lacks the desirable pliable nature of a prepreg formed while using a thermosetting resin. When attempts have been made to dissolve the thermoplastic polymer in a solvent and to impregnate the fibrous material followed by evaporation of the solvent, difficulties also commonly have been encountered. For instance, some thermoplastic polymers are not readily soluble, uniform impregnation has been difficult to achieve, and complete solvent removal commonly has been a problem.

Blends of reinforcing fibers and thermoplastic fibers have been proposed for use in the formation of composite articles wherein the thermoplastic fibers are melted to form the matrix phase. Such blends inherently lack tack which is useful during layup to form a fiber-reinforced composite article.

Reference also can be found in the literature to providing the matrix-forming thermoplastic polymer as small particles which are mixed with the fibrous material prior to composite formation. Heretofore, such proposals have not become a commercial reality primarily because of the inability to achieve uniform impregnation of the fibrous reinforcement, the tendency of the polymer particles to further segregate within the fibrous material and to separate from the fibrous material, and the necessity to melt the particles following placement among the fibers so as to immobilize the same. Such fusion has resulted in the formation of a stiff boardy product which lacks tack and is largely unsuitable for use in the formation of a composite article having a complex configuration. Also, when the impregnation is not uniform the polymer matrix will not be uniformly dispersed among fibers in the resulting composite article. This will result in a voidy product having resin-rich and resin-lean areas and unpredictable nonuniform mechanical properties.

British Patent No. 1,264,432 concerns the application of a dispersion of particles of a thermoplastic polymer to newly spun glass fibers.

British Patent No. 1,424,168 concerns the formation of a stiff sheet or tape prepreg wherein fibers are contacted with a bath containing water, thickening agent, and resin particles which immediately thereafter are melted at a temperature between 60° to 100° C. to cause the particles to adhere to the fibers. Uniform fiber impregnation would not be achieved and the stable tacky and pliable product of the present invention would not result.

U.S. Pat. No. 4,292,105 concerns the impregnation of a fibrous material from a bath of the specified composition containing water, thickener, and polymer particles. The conditions described would not achieve uniform impregnation to produce a quality prepreg. Also, in the working examples the product would have no drapability since it was heated to fuse the polymer.

U.S. Pat. No. 4,626,306 concerns the impregnation of a fibrous lap with resin particles by dipping in a bath containing the particles in the absence of a binding agent. Uniform fiber impregnation would not be achieved and the stable tacky and pliable product of the present invention would not result.

U.S. Pat. No. 4,680,224 makes reference to the impregnation of fiber strands with a polymer powder or a slurry of powder. The patent is devoid of teachings concerning how such impregnation can be accomplished in the improved manner contemplated herein or how one could provide the improved product of the present invention.

It is an object of the present invention to provide a method for the formation of an improved fibrous material suitable for the formation of a substantially void-free composite article comprising a plurality of adjoining substantially parallel reinforcing fibers.

It is an object of the present invention to provide an improved method for impregnating a fibrous material with solid particles of a matrix-forming thermoplastic polymer in a uniform and consistently reliable manner.

It is an object of the present invention to provide an improved method for producing a fibrous product suitable for use in the production of composite articles having solid particles of matrix-forming thermoplastic polymer substantially uniformly dispersed between adjoining filaments in a uniform and stable manner in the absence of fusion bonding.

It is another object of the present invention to provide a method for producing an improved product containing solid particles of thermoplastic polymer substantially uniformly dispersed among adjoining filaments which is drapable and tacky at ambient conditions, is handleable without segregation of the particles within the fibrous material, and which upon the application of heat and pressure can be transformed into a substantially void-free composite article of a predetermined configuration.

It is a another object of the present invention to provide an improved fibrous material suitable for use in the formation of a fiber-reinforced substantially void-free composite article and which exhibits a combination of highly desirable characteristics as discussed herein including drapability, handleability without adverse consequences, and tack.

It is a further object of the present invention to provide an improved fibrous material suitable for use in the formation of high performance fiber-reinforced parts for use in aircraft, spacecraft, industrial machinery and automotive applications.

These and other objects, as well as the scope, nature and utilization of the present invention will be apparent to those skilled in the art from the following detailed description and appended claims.

SUMMARY OF THE INVENTION

It has been found that a method for the production of an improved fibrous material suitable for the formation of a substantially void-free composite article comprising a plurality of adjoining substantially parallel reinforcing filaments (e.g., a single end, a plurality of ends, a cloth, etc.) in association with a matrix-forming thermoplastic polymer (preferably a high performance engineering thermoplastic polymer) comprises:

(a) preparing a dispersion of solid particles of a thermoplastic polymer in an aqueous medium which contains an effective amount of a dissolved polymeric binding agent (preferably a polyacrylic acid binding agent possessing a cross-linked molecular structure), (b) substantially increasing the viscosity of the dispersion to form an improved impregnation bath whereby the viscosity of the resulting bath becomes at least 50,000 cps. and the impregnation bath has a plastic flow characteristic with shear-thinning behavior which is sufficient to substantially uniformly suspend the particulate thermoplastic polymer within said bath, (c) impregnating the adjoining substantially parallel reinforcing filaments with the bath under conditions wherein the bath is caused to flow between the adjoining filaments by the application of work wherein the bath flow inherently results in a reduction of the viscosity of the bath which aids in the incorporation of the particulate thermoplastic polymer between adjoining filaments, and (d) controlling the content of the aqueous medium in the resulting fibrous material to provide a product having the particles of matrix-forming thermoplastic polymer substantially uniformly dispersed between adjoining filaments which inherently (1) is drapable and tacky at ambient conditions, (2) is handleable without segregation of the particles within the fibrous material, and (3) which upon the application of heat and pressure can be transformed into a substantially void-free fiber-reinforced composite article of a predetermined configuration wherein the solid particles form the matrix phase.

It has been found that a method for the production of an improved fibrous material suitable for the formation of a substantially void-free composite article comprising a plurality of adjoining substantially parallel reinforcing filaments in association with a matrix-forming thermoplastic polymer (preferably a high performance engineering polymer) comprises:

(a) providing a plurality of reinforce fibrous tows each comprising a plurality of adjoining substantially parallel filaments, (b) preparing a dispersion of solid particles of thermoplastic polymer in an aqueous medium which contains an effective amount of dissolved polyacrylic acid binding agent possessing a cross-linked molecular structure, (c) raising the pH of the aqueous medium to form an improved impregnation bath wherein the viscosity of the resulting bath is substantially increased to at least 50,000 cps. through the stiffening of the molecules of the binding agent and the impregnation bath has a plastic flow characteristic with shear-thinning behavior which is sufficient to substantially uniformly suspend the particulate thermoplastic polymer within the bath, (d) situating the resulting bath within an impregnation apparatus, (e) aligning the reinforcing fibrous tows in a side-by-side relationship to form a substantially uniform sheet-like tape, (f) feeding the sheet-like tape to the impregnation apparatus, (g) impregnating the substantially uniform sheet-like tape with the bath while present in the impregnation apparatus under conditions wherein the bath is caused to flow between the adjoining filaments of the sheet-like tape by the application of work wherein the flow inherently results in a reduction of the viscosity of the bath which aids in the incorporation of the particulate thermoplastic polymer between adjoining filaments, and (h) controlling the content of the aqueous medium in the resulting sheet-like tape to provide a product having the particles of the matrix-forming thermoplastic polymer substantially uniformly dispersed between adjoining filaments in the absence of fusion bonding which inherently (1) is drapable and tacky at ambient conditions, (2) is handleable without segregation of the particles, and (3) which upon the application of heat and pressure can be transformed into a substantially void-free fiber-reinforced composite article of a predetermined configuration wherein the solid particles form the matrix phase.

An improved fibrous material suitable for the formation of a fiber-reinforced composite article is provided which comprises (a) a plurality of adjoining substantially parallel reinforcing filaments, (b) an effective amount of a polymeric water-soluble binding agent (preferably a polyacrylic acid binding agent possessing a cross-linked molecular structure wherein the molecules are extended), (c) aqueous medium, (d) and solid particles of thermoplastic polymer (preferably a high performance engineering polymer) substantially uniformly dispersed between adjoining filaments in the absence of fusion bonding, which inherently (1) is drapable and tacky at ambient conditions, (2) is handleable without segregation of the particles within the fibrous material, and (3) which upon the application of heat and pressure can be transformed into a substantially void-free composite article of a predetermined configuration wherein the solid particles form the matrix phase.

BRIEF DESCRIPTION OF DRAWINGS

FIG. 19 is a perspective view of the drying apparatus shown in FIG. 1;

FIG. 20 is a perspective view of the take-up apparatus shown in FIG. 1;

FIG. 26 is a top view of an immersion means useful in the present invention;

FIG. 27 is a front, partially sectional view of the apparatus of FIG. 26 taken along lines 30—30 of FIG. 26;

DESCRIPTION OF PREFERRED EMBODIMENTS

Figure 1:
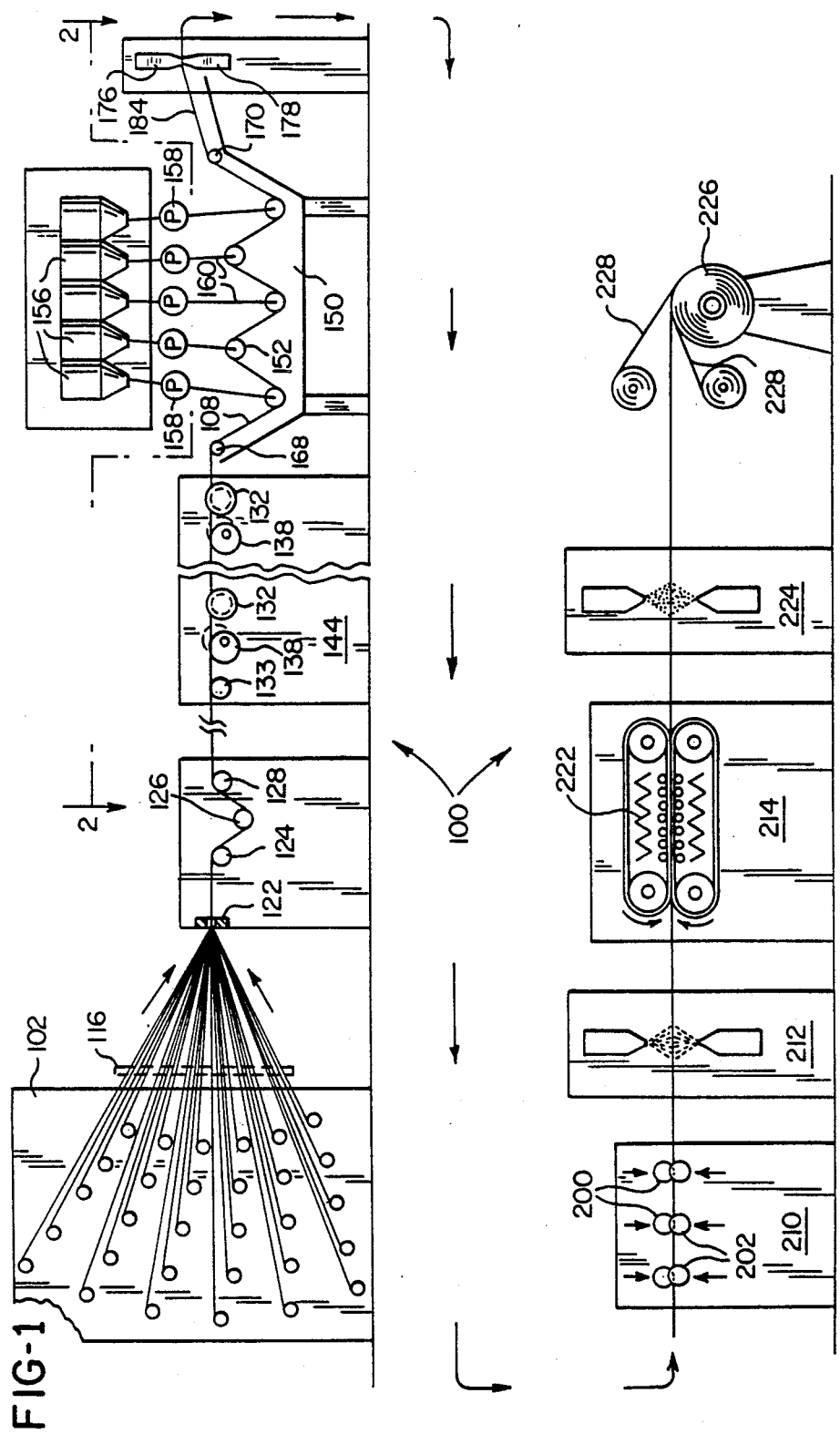
FIG. 1 is a schematic overall view of a preferred apparatus for impregnating a plurality of adjoining tows in accordance with the improved process of the present invention.

A fibrous material comprising a plurality of adjoining substantially parallel filaments initially is selected for use as fibrous reinforcement in the present invention. Such fibrous material may be provided as a single multifilamentary end, a plurality of multifilamentary ends each comprising a plurality of substantially parallel filaments, a cloth (e.g., woven, knitted, or braided) which incorporates a plurality of substantially parallel filaments, etc. For instance, fibrous tows or tapes of varying widths conveniently may be selected as the reinforcing fibrous material. A single tow of a relatively narrow width may be impregnated. Alternatively, wider fibrous materials having widths of 1 to 48 inches or more likewise may undergo such impregnation.

Those fibrous materials which heretofore have been used as fibrous reinforcement in the production of composite articles commonly are selected. For instance, representative fibrous materials include carbon, glass, aramid, silicon carbide, silicon nitride, boron nitride, other synthetic polymers capable of use at elevated temperatures, mixtures of these, etc. The preferred carbonaceous fibrous materials contain at least 90 percent carbon by weight which may comprise carbon which is either amorphous or graphitic in nature. Preferred carbonaceous fibrous materials commonly contain at least 3,000 (e.g., 3,000 to 12,000, or more) substantially parallel filaments per end. Such carbon filaments commonly are approximately 4 to 10 microns in diameter. Representative preferred carbonaceous fibrous materials for use in connection with the present invention are Celion carbon fibers which are commercially available from BASF Structural Materials, Inc., Charlotte, N.C., U.S.A. Also, glass filaments which are capable of being readily impregnated by the flow of the impregnation bath described hereafter may be selected. Such glass filaments commonly have a diameter of approximately 10 to 20 microns (e.g., 12 to 13 microns). Suitable aramid fibers are commercially available from E.I. DuPont, Wilmington, Del., U.S.A., under the Kevlar trademark and may have a diameter as low as 5 to 8 microns. The fibrous material preferably is unsized, or if a size is present such size does not preclude the ready insertion of the thermoplastic polymer particles between adjoining filaments during the impregnation step (described hereafter). It is, of course, important that the reinforcing fibers selected well retain their fibrous integrity and reinforcing properties at the temperature used to fuse the thermoplastic polymer while in association with such fibers during composite formation. For instance, in a preferred embodiment the fibrous reinforcement can withstand temperatures greater than 537.8° C. (i.e., 1000° F).

During the preparation of the impregnation bath employed in the process of the present invention, small particles of a matrix-forming thermoplastic polymer initially are dispersed in an aqueous medium containing a dissolved polymeric binding agent and having a relatively low viscosity. Thereafter the viscosity of the dispersion substantially is increased to form a stable improved impregnation bath having a plastic flow characteristic with shear-thinning behavior (as described hereafter).

The solid particulate matrix-forming thermoplastic polymer which is selected for use in the present invention when in association with the fibrous reinforcement following the application of heat and pressure is capable of forming a substantially void-free fiber-reinforced composite article wherein the polymer particles are transformed into the matrix phase. Such substantially void-free character is present when the resulting composite article exhibits less than two percent voids by volume. The particulate thermoplastic polymer selected may exhibit a distinct molten phase upon the application of heat in the absence of a cross-linking agent. Alternatively, the particulate thermoplastic polymer may be thermosinterable and exhibit the ability to consolidate when the adjoining particles are heated under pressure.

The thermoplastic polymer selected may be polyethylenes, polypropylenes, polyesters (e.g., polyalkylene terephthalates, such as polyethylene terephthalates, polybutylene terephthalates, etc.), polyamides (e.g., nylon 6, nylon 66, nylon 610, etc.), polyvinyl chlorides, polystyrenes, polycarbonates, polyoxymethylenes, etc., and mixtures of these. Copolymers, terpolymers, etc. of such polymers likewise are included. Such thermoplastic polymers commonly exhibit a glass transition temperature above 25° C. and a melting temperature above 70° C.

In a preferred embodiment of the present invention the particulate thermoplastic polymer is a high performance engineering polymer. Such polymers commonly exhibit a glass transition temperature above 80° C. (most preferably above 140° C.) and a melting temperature above 150° C. (most preferably above 200° C.). Representative, high performance engineering polymers include polysulfones, polyether sulfones, polyphenylene oxides, polyetherimides, anisotropic melt-forming polyesters, anisotropic melt-forming polyesteramides, anisotropic melt-forming polycarbonates, polycarbonates, polyimides, polyamideimides, polyimidesulfones, polyarylenesulfides, polyalkyleneetherketones, etc., and mixtures of these. Copolymers, terpolymers, etc. of such polymers likewise are included. Commonly, polyimides and polyamideimides are thermosinterable and may undergo a linear addition reaction when heated. Particles of these polymers may undergo consolidation to form a continuous matrix when adjoining particles are heated under pressure.

The matrix-forming thermoplastic polymer is provided as small solid particles having a particle size in the range of approximately 0.1 to 100 microns, and preferably a particle size of 0.1 to 20 microns. In a particularly preferred embodiment at least 50 percent of the particles are smaller than 10 microns. Accordingly, the mean particle size preferably is less than 50 microns. Those thermoplastic polymers exhibiting higher melt viscosities advantageously are provided as extremely small particles. Cryogenic grinding or other known grinding or particle-forming techniques may be employed to provide the thermoplastic polymer in an extremely fine form.

The aqueous medium in which the solid particles of thermoplastic polymer are dispersed contains water as the major component and optionally may include in a minor concentration one or more water-miscible organic liquids which do not interfere with the desired uniform impregnation, e.g., methanol, ethanol, isopropanol, ethylene glycol, etc. In some instances, the presence of such water-miscible organic liquids, because of their increased volatility, may expedite the removal of a portion of the aqueous medium following impregnation, should this be desired. However, in a preferred embodiment the aqueous medium is substantially pure water.

A suitable polymeric binding agent is dissolved in an effective concentration in the aqueous medium in which the solid particles of thermoplastic polymer are initially dispersed while at a relatively low viscosity. Such binding agent must be capable of facilitating a substantial increase in the viscosity of the dispersion during a subsequent step of the process to form an improved highly stable gelled impregnation bath having a plastic flow characteristic with shear-thinning behavior wherein the polymer particles are substantially uniformly suspended. Such increase in viscosity commonly is accomplished through the addition of an agent which interacts with the dissolved polymeric binding agent. The resulting impregnation bath containing the dissolved polymeric binding agent, when caused to flow between adjoining filaments of the fibrous material by the application of work, exhibits a shear-thinning behavior which inherently results in a reduction of the impregnation bath viscosity and thereby greatly aids in the incorporation of the solid particulate thermoplastic polymer between adjoining filaments. The binding agent also causes the filaments to adhere well to each other and to exhibit tacky properties in the presence of the aqueous medium.

The preferred water-soluble polymeric binding agent which possesses the requisite properties for use in the present invention is a polyacrylic acid binding agent possessing a cross-linked molecular structure. Such binding agent is a water-soluble carboxy vinyl polymer (sometimes termed carboxy polymethylene) of the following basic structure:

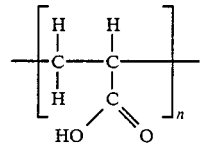

The crosslinks are slight in nature and commonly are provided by polyalkenyl polyether at a level which allows for water solubility. When heretofore used in cosmetic products, this material has been known as "carbomer". This polymeric binding agent is commercially available from B. F. Goodrich, Cleveland, Ohio, U.S.A. under the Carbopol trademark, and is described in its May, 1986 publication entitled "Carbopol® Water Soluble Resins". Representative, water-soluble binding agents of this type which are available from B. F. Goodrich are Carbopol 910, Carbopol 934, Carbopol 940, and Carbopol 941. The polyacrylic acid binding agent possessing a cross-linked molecular structure advantageously may possess a molecular weight from 450,000 to 4,000,000 and preferably from 750,000 to 3,000,000. Such binding agents commonly possess a coiled molecular structure when purchased.

The water-soluble binding agents employed in the present invention commonly are provided in the dispersion prior to the substantial increase in viscosity in a concentration of approximately 0.01 to 5 percent (e.g., 1 to 5 percent) based upon the total weight of the dispersion, and preferably in a concentration of approximately 0.01 to 2 percent by weight based upon the total weight of the dispersion. If the concentration of the binding agent is too low, the desired subsequent substantial increase in viscosity will not be possible, and the product will not possess the desired physical properties.

Also, if the concentration of binding agent is too great, no concomitant advantage will be realized and the binding agent may interfere with the desired composite properties. The higher molecular weight binding agents offer the advantage of functioning at lesser concentrations. Accordingly, in a particularly preferred embodiment the water-soluble binding agent is present in the initial dispersion in a concentration of approximately 0.1 to 1.5 percent by weight.

Other representative water-soluble polymeric binding agents suitable for use in the present invention include polyvinyl alcohol and polyvinyl pyrrolidone.

The particulate thermoplastic polymer commonly is provided in the initial dispersion containing the dissolved polymeric binding agent in a concentration of approximately 5 to 50 percent by weight based upon the total weight of the dispersion, and preferably in a concentration of approximately 10 to 30 percent by weight (e.g., approximately 15 percent by weight).

The initial dispersion may optionally contain a surfactant in a minor concentration to aid in the wetting of the particles of the thermoplastic polymer. For instance, the surfactant may be present in a concentration of approximately 0.005 to 0.5 percent by weight of the total dispersion, and preferably in a concentration of 0.01 to 0.2 percent by weight. Any surfactant may be employed provided it does not interfere with the subsequent viscosity increase or otherwise adversely influence the resulting product such as through the creation of an excessive amount of foam or bubbles. Representative surfactants which may be used to advantage in the present process include surfactants based on alkylaryl polyether alcohols (e.g., alkyl phenoxypolyethoxy ethanol), sulfonates and sulfates. A surfactant commercially available from the Rohm and Haas Company, Philadelphia, Penn., U.S.A., under the Triton X100 trademark, may be used to advantage.

A small amount of a lubricant such as glycerine may optionally be provided in the initial dispersion. For instance, glycerine may be provided in a concentration of approximately 2 percent by weight. However, good results are achieved in the total absence of such lubricant.

Alternatively, a finely divided particulate filler may also be included in the impregnation bath in order to modify the properties of the resulting composite article. Representative fillers include carbon powder; metallic powders, such as aluminum, titanium, etc.; silicates; silicon; tungsten carbide; porcelain; clay; feldspar; quartz; titanates; mica; glass beads; silica; etc.; and discontinuous fibers such as inorganic or organic fibers. In a preferred embodiment such fillers are not employed.

The viscosity of initial dispersion is sufficiently low so that the resin particles can be thoroughly dispersed throughout the aqueous medium while using moderate agitation. Particularly good results are obtained when both the polymeric binding agent and the particulate thermoplastic polymer are blended together as solid particles and are thereafter introduced into the aqueous medium with moderate agitation. Commonly, the viscosity of the initial dispersion is well below 50,000 cps. when tested using a Rheomttrics Stress Rheometer (Model RSR/M) while operating at a shear rate of 0.01 reciprocal second. Preferably, the viscosity of the initial dispersion is no more than 30,000 cps., and most preferably no more than 20,000 cps. (e.g., 2,000 to 20,000 cps.) in accordance with such test conditions.

Once the dispersion of the particulate thermoplastic polymer is achieved under such relatively low viscosity conditions, the viscosity is substantially increased to form an improved impregnation bath having a plastic flow characteristic with shear-thinning behavior which is sufficient to substantially uniformly suspend the particulate thermoplastic polymer within the bath. More specifically, the viscosity of the dispersion is raised to at least 50,000 cps. when tested using a Rheometrics Stress Rheometer at a shear rate of 0.01 reciprocal second. Such viscosity increase preferably is at least 50 percent, and viscosity increases of 1.5 to 25 times, or more, may be utilized. Commonly, the resulting viscosity will be within the range of approximately 50,000 to 3,000,000 cps. when using a Rheometrics Stress Rheometer at a shear rate of 0.01 reciprocal second, and preferably within the range of 50,000 to 1,000,000 cps. (e.g., 50,000 to 250,000 cps.).

The viscosity commonly is caused to increase through the addition of an agent which interacts with the dissolved polymer binding agent. Such interaction in preferred embodiments may be accomplished through the adjustment of the pH of the initial dispersion. For instance, when a dissolved polyacrylic acid binding agent possessing a cross-linked molecular structure is employed, the dispersion inherently exhibits an acidic pH which commonly falls within the range of approximately 2.5 to 3.5. When a base, such as sodium hydroxide, is added to the initial dispersion, the corresponding adjustment in the pH causes the stiffening (i.e., uncoiling and extension) of the previously coiled molecules of such binding agent which substantially raises the viscosity of the dispersion with the particles of thermoplastic polymer being substantially uniformly suspended in a highly stable manner within the resulting impregnation bath. For instance, sufficient sodium hydroxide may be added to the dispersion to accomplish some neutralization and to raise the pH to within the range of 4 to 10, and most preferably within the range of 6 to 8.

Alternatively, when the dissolved polymeric binding agent is polyvinyl alcohol, borax (i.e., $Na_2B_4O_7 \cdot 10H_2O$) may be added to bring out the desired viscosity increase. When polyvinyl pyrrolidone is employed as the polymeric binding agent, the initial dispersion may be simply acidified whereby the pH is lowered in order to bring about the required substantial increase in viscosity.

The plastic flow behavior of the resulting impregnation bath provides the particulate thermoplastic polymer in a vehicle which is capable of bringing about the impregnation of the fibrous material in a highly uniform manner over an extended period of time. The particulate thermoplastic polymer is well suspended therein, thereby making possible the formation of a consistent and uniform product.

In a preferred embodiment, the resulting impregnation bath possesses a plastic flow rheology characterized by a Brookfield Yield Value above the minimum value required to permanently suspend even the largest particles of the thermoplastic polymer present in the static bath while under the influence of gravity. Such Minimum Brookfield Yield Value can be theoretically calculated for any specific particle of thermoplastic polymer in accordance with the following equation:
Minimum Brookfield Yield Value $= [23.6 \ R(D-D_o)_g]^{\frac{2}{3}}$
with units in dynes/cm.$^2$, where:
R = Particle Radius (cm.), D = Particle Density (gm./cc.),
D$_o$ = Suspending Medium Density (gm./cc.), and
g = Gravitational Constant = 980 cm./sec.$^2$.

For example, the Minimum Brookfield Yield Value for a 50 micron particle of polyetheretherketone (D = 1.30 gm./cc.) is approximately 6.6 dynes/cm.$^2$. The Brookfield Yield Value for any dispersion can be determined with sufficient accuracy using a Brookfield RVT viscometer and spindle No. 1 in accordance with the following equation:

$$\text{Brookfield Yield Value} = \frac{\text{Apparent Viscosity at 0.5 RPM} - \text{Apparent Viscosity at 1.0 RPM}}{100}.$$

In preferred embodiments the Brookfield Yield Value of the impregnation bath is at least 1.5 times the Minimum Brookfield Yield Value, and most preferably at least 2 times the Minimum Brookfield Yield Value (e.g., 2 to 10 times, or more) in order to build further stability into the improved impregnation bath which is utilized in the process of the present invention.

Next, the adjoining substantially parallel reinforcing filaments are impregnated with the improved impregnation bath under conditions wherein the bath is caused to flow between adjoining filaments by the application of work wherein the bath flow inherently results in a substantial reduction of the relatively high viscosity of the bath which aids in the incorporation of the particulate thermoplastic polymer between adjoining filaments. Accordingly, the improved impregnation bath exhibits a shear-thinning behavior which is an important element of the present invention. For instance, a dispersion viscosity of 100,000 cps. using a Rheometrics Stress Rheometer (Model RSR/M) at a shear rate of 0.01 reciprocal second for such an improved impregnation bath typically will be reduced to less than 500 cps. at a shear rate of 500 reciprocal seconds. This behavior permits the particulate thermoplastic polymer from settling while in the static bath at zero shear rate conditions and allows the particles of thermoplastic polymer to be impregnated between adjoining filaments when work is applied to the bath. Also, once the zero shear condition is reestablished within the resulting fibrous material, a highly stable prepreg product results as discussed herein.

The improved impregnation bath may be caused to flow between the adjoining filaments of the fibrous material by any one of a number of techniques. Preferably, the adjoining filaments are somewhat spread at the time of impregnation. The impregnation may be carried out while the fibrous material is immersed in the impregnation bath and the work is applied as the adjoining filaments while under tension are passed in contact with at least one solid member (e.g., a stationary rod or roller). Alternatively, the impregnation may be carried out as the filaments contact the outer surface of at least one perforated tube through which the bath is forced, or the filaments while in contact with the impregnation bath are passed through a die and/or between one or more sets of rollers. If desired, the impregnation of the fibrous material may be carried out immediately following fiber formation with the fibers passing to the impregnation apparatus.

Next, the content of the aqueous medium in the resulting fibrous material is controlled to provide a product having the particles of matrix-forming thermoplastic polymer substantially uniformly dispersed between adjoining filaments in the absence of fusion bonding. Following impregnation, the concentration of aqueous medium in the resulting fibrous material is controlled at the desired level. Commonly, such aqueous medium within the fibrous material is controlled at a concentration above approximately 40 percent by weight, and preferably within the range of approximately 10 to 70 percent by weight based upon the total weight. In a particularly preferred embodiment, the aqueous medium is provided at a concentration within the range of approximately 40 to 60 percent by weight.

Commonly, the fibrous material following impregnation is dried under conditions wherein a portion of the aqueous medium is volatilized and then is immediately used for composite formation, or is otherwise stored under conditions wherein it is sealed and further loss of the aqueous medium is minimized or prevented prior to composite formation.

In another embodiment of the process the resulting fibrous material following drying to remove aqueous medium is subsequently contacted (e.g., sprayed) with additional aqueous medium in order to maintain the desired characteristics. Accordingly, the quantity of aqueous medium within the product can be reduced or increased at will to fine tune the characteristics of the resulting product to best meet the needs of a specific end use.

Commonly, the resulting product which is suitable for the formation of a substantially void-free composite article contains the particles of matrix-forming thermoplastic polymer in a concentration of approximately 6 to 45 percent by weight, and preferably in a concentration of approximately 8 to 30 percent by weight (e.g., approximately 15 percent by weight). Commonly, the resulting product contains the fibrous material in a concentration of approximately 15 to 55 percent by weight (e.g., approximately 20 to 30 percent by weight), and the water-soluble binding agent in a concentration of approximately 0.02 to 2.2 percent by weight (e.g., approximately 0.04 to 1.5 percent by weight).

The resulting product prior to composite formation is drapable at ambient conditions and can readily be shaped in a manner similar to that of a prepreg formed using an uncured or partially-cured thermosetting resin. Such drapable character preferably is evidenced by a flexural rigidity of less than 15,000 mg. cm., and most preferably less than 10,000 mg. cm. (e.g., less than 5,000 mg. cm.) when tested in accordance with ASTM D1388. This enables the formation of a composite article by filament winding or a composite article wherein the impregnated fibrous material must assume a complex configuration within a mold. The tacky nature of the product can be attributed to the gelled nature of the impregnation bath. This enables adjoining layers of the fibrous material to well adhere and to remain at a predetermined location during composite formation. In a preferred embodiment the resulting fibrous material passes the tack test of NASA Technical Bulletin 1142. Also, the product prior to composite formation is highly stable and handleable without segregation of the particles within the fibrous material. Such absence of segregation leads to the retention of the particles of thermoplastic polymer, prevents their migration within the fibrous material, and leads to the formation of a highly uniform composite article with no significant variation throughout its cross section.

Substantially void-free composite articles can be formed from the product of the present invention upon the application of heat which exceeds the melting temperature of the thermoplastic particles or reaches the temperature at which the thermoplastic particles become heat-sinterable. Such temperature should be below that which any significant polymer degradation occurs. The major portion of the aqueous medium may be removed when the fibrous material is either inside or outside the mold. During composite formation pressure also is applied and a means commonly is provided for the removal of volatilized aqueous medium and any other gaseous by-products present therein. Typical mold pressures during composite formation are approximately 0.3 to 4 MPa (e.g., 0.6 to 2.5 MPa). The substantially void-free nature of the product is manifest by less than a two percent void content in the solid composite article which is produced (preferably less than one percent void content).

In a preferred embodiment the product of the present invention is capable of forming a composite article having a zero degree flexural strength of at least 60 percent of the theoretical value when tested in accordance with ASTM D790-84a, Method II, Procedure A, at a span-to-depth ratio of 32:1, and most preferably at least 70 percent of the theoretical value.

Also, in a preferred embodiment the product of the present invention is capable of forming a composite article having a zero degree flexural modulus of at least 80 percent of the theoretical value when tested in accordance with ASTM D790-84a, Method II, Procedure A, at a span-to-depth ratio of 32:1, and most preferably at least 85 percent of the theoretical value.

The theoretical flexural modulus value of a fiber-reinforced composite can be defined as follows:

$E_F(\text{theoretical}) = K_{Fpl} \ [V_f E_f + (1-V_f) E_m]$, where $K_F = 2/(1 + E_T/E_c)$, $E_F(\text{theoretical})$ = theoretical flexural modulus of the composite, $E_T$ = tensile modulus of the composite,
$E_c$ = compressive modulus of the composite,
$E_f$ = tensile modulus of the fiber,
$E_m$ = flexural modulus of the matrix, and
$V_f$ = volume fraction of the fiber.

In order to determine the percent translation of the theoretically attainable flexural modulus the following equation is used:

$$\text{Percent Flexural Modulus Translation} = \frac{E_f(\text{ASTM D790})}{E_F(\text{theoretical})} \times 100.$$

The theoretical flexural strength value and the percent translation of the theoretically attainable flexural strength equations have been simplified to the following for ease of calculation:

$S_F(\text{theoretical}) = V_f S_f$, where
$S_F(\text{theoretical})$ = theoretical flexural strength of the composite,
$S_f$ = tensile strength of fiber, and
$V_F$ = volume Fraction of the fiber as stated above.

In order to determine the percent translation of the theoretically attainable flexural strength the following equation is used:

$$\text{Percent Flexural Strength Translation} = \frac{S_f(\text{ASTM D790})}{S_F(\text{theoretical})} \times 100.$$

Figure 2:
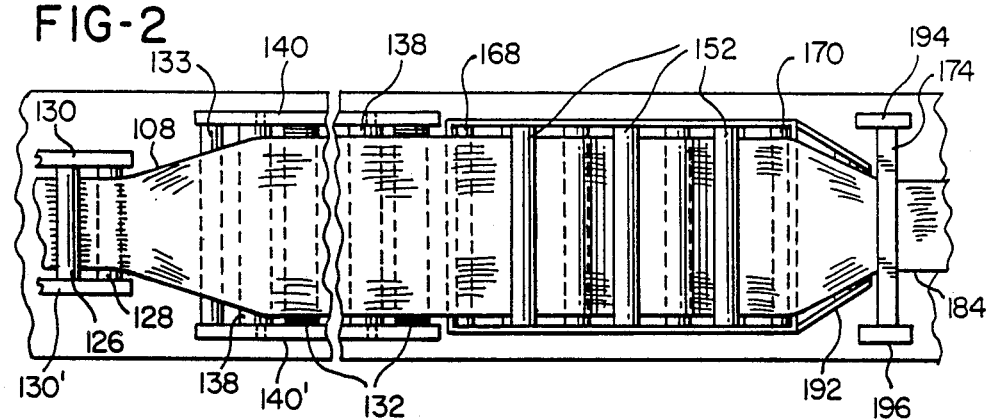
FIG. 2 is a top view of an portion of the apparatus of FIG. 1, taken along lines 2—2.
Figure 3:
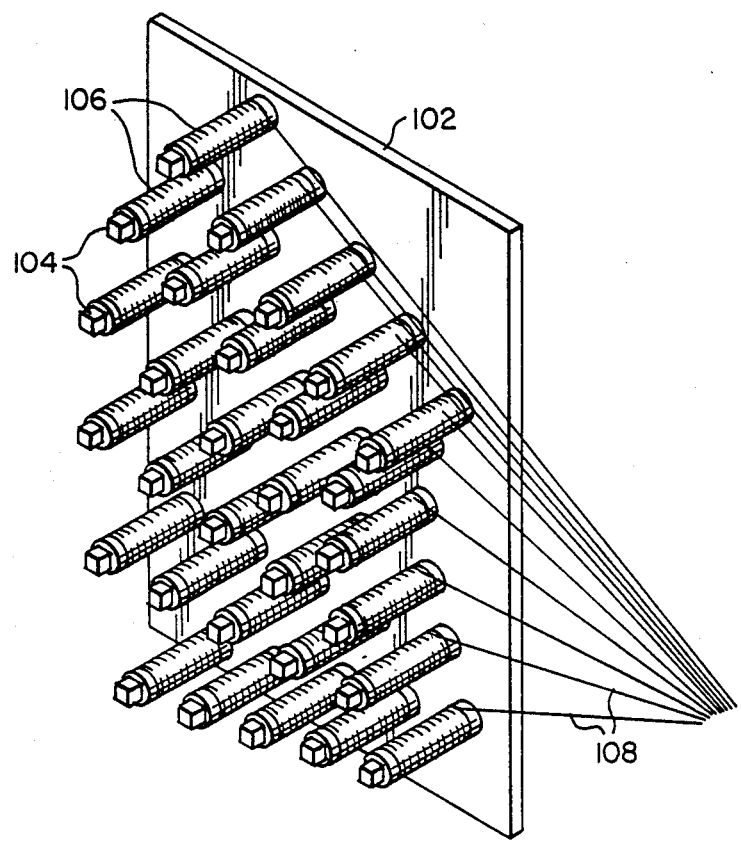
FIG. 3 is a perspective view of the board for mounting spools of fibrous tows to be impregnated in the apparatus of FIG. 1.
Figure 4:
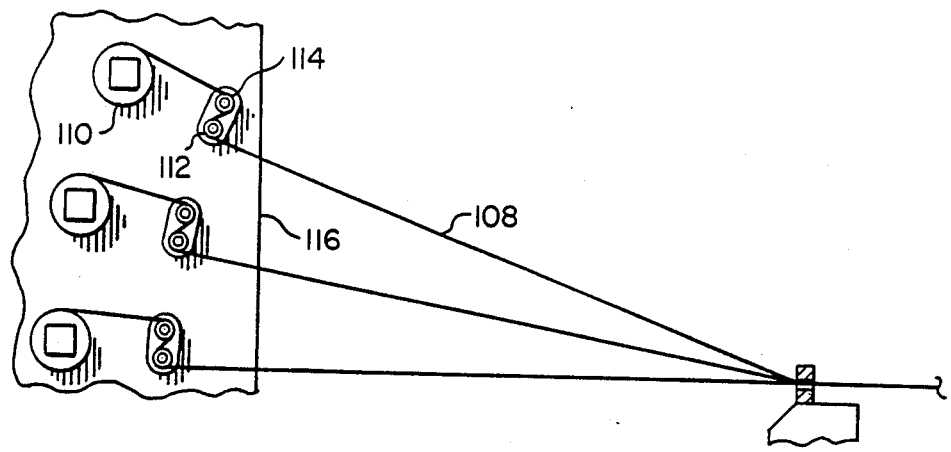
FIG. 4 is a partial sectional view of a tensioning apparatus utilized in the initial portion of the apparatus shown in FIG. 1.
Figure 5:
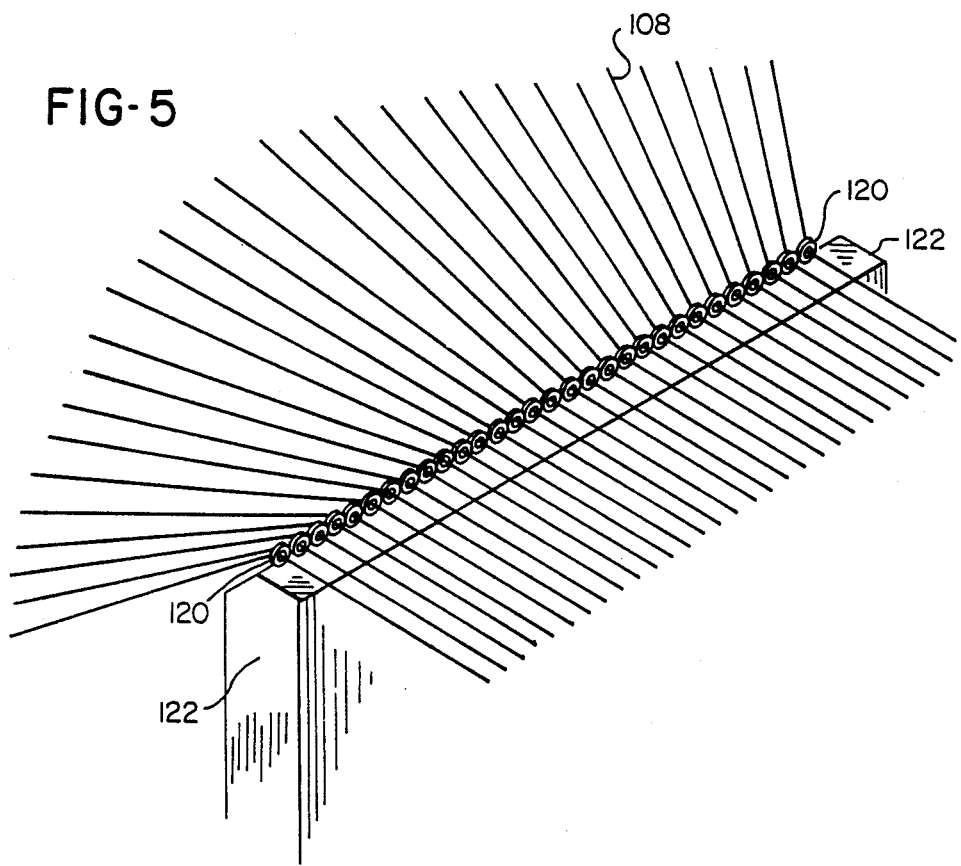
FIG. 5 is a sectional view of a portion of the apparatus used to align the fibrous tows as they pass through the apparatus of FIG. 1.
Figure 6:
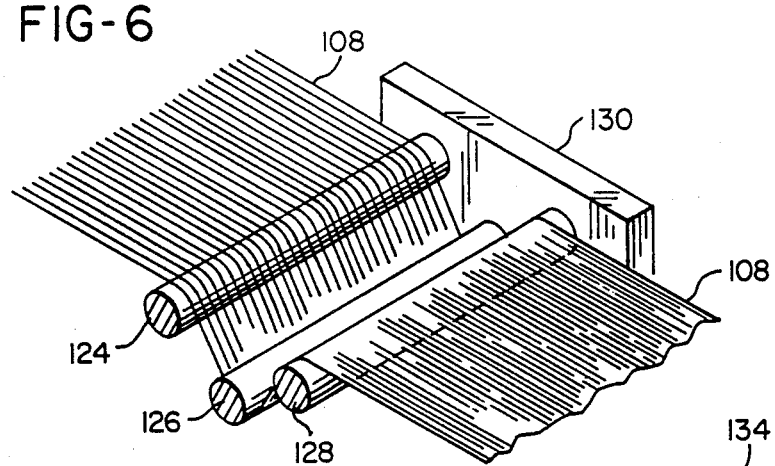
FIG. 6 is a sectional view of another portion of the aligning means of the apparatus shown in FIG. 1.
Figure 10:
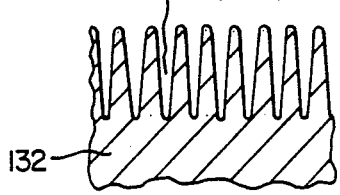
FIG. 10 is a sectional view of the apparatus of FIG. 9 taken along lines 10—10.
Figure 7:
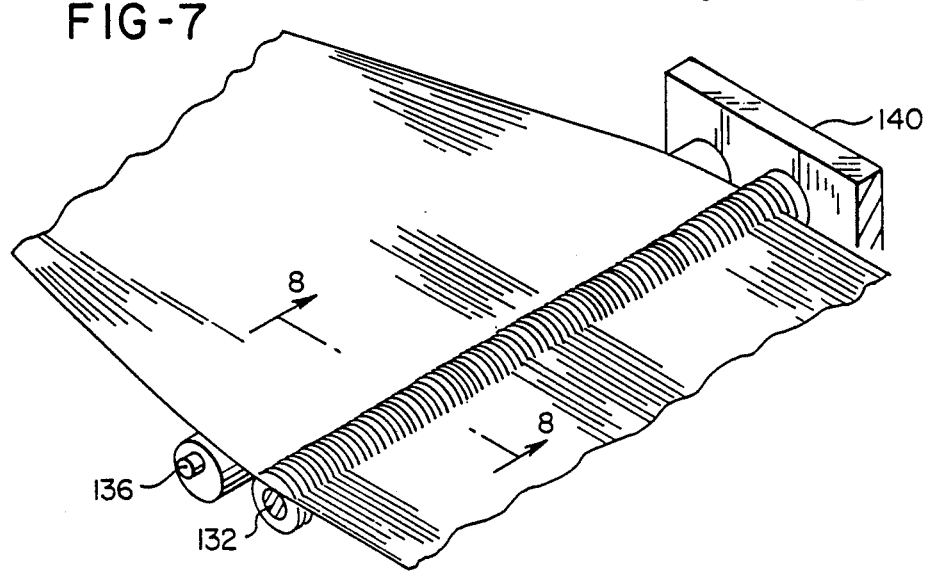
FIG. 7 is a partial sectional view of the grooved rollers and eccentric rollers utilized in a portion of the apparatus in FIG. 1.
Figure 9:
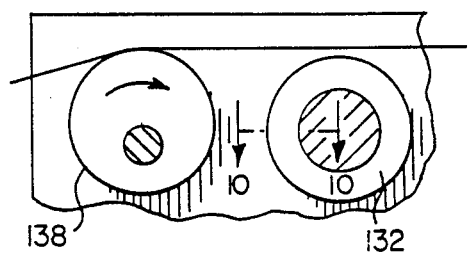
FIG. 9 is a cross-sectional view of the apparatus shown in FIG. 8 with the eccentric roller rotated 180°.
Figure 8:
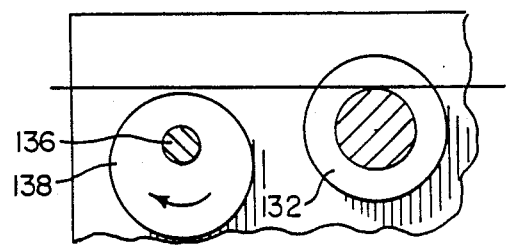
FIG. 8 is a cross-sectional view of the apparatus shown in FIG. 7.

Reference now is made to the drawings for a discussion of preferred impregnation apparatus arrangements for use when carrying out the process of the present invention. With reference to FIGS. 1 and 3, a support 102 has affixed thereto supporting members 104 for a plurality of spools of fibrous tow 106 spaced across a surface thereof. The fibrous tows 108 While shown as a singular line in reality are comprised of a plurality of substantially parallel filaments. The tows are maintained under tension as best shown in FIG. 4 by means of spaced rollers 110, 112 and 114 in a spaced relationship to each other on a support 116. The tows 108 are then passed through a series of eyelets 120 shown in FIG. 5 which are spaced apart from each other on support member 122. The plurality of tows is then passed around a series of rods best shown in FIG. 6 and identified by reference numerals 124, 126, and 128, each of which is supported on member 130. As the tows 108 proceed through the aligning apparatus they begin to take on a sheet, fabric, or tape-like unidirectional configuration. The rods 124, 126, and 128 are supported between members 130 and 130', as shown in FIG. 2. There could be a greater number of rods comprising the aligning rods 124, 126, and 128 as desired. To further assist in the aligning of the fibrous tows and to form a more uniform sheet-like tape, the plurality of tows are fed to a grooved roller 132 having grooves 134 best shown in FIGS. 7 and 10. A roller 138 is eccentrically mounted on shaft 136 and rotates in clockwise direction as best shown in FIGS. 7, 8, and 9 so that the tows may be alternatingly lifted and uniformly spread about the grooved roller 132. This is best shown comparing the rotation of the eccentrically mounted roller in FIG. 8 to that shown in FIG. 9. The eccentrically mounted roller 138 has a smooth surface which facilitates movement of the tows over the roller. The grooved roller and the eccentrically mounted roller are supported on members 140 and 140'. A plurality of these eccentric and grooved rollers are shown in aligning section 144. Positioning roller 133 passes the tows to the eccentrically mounted roller 138.

Figure 12:
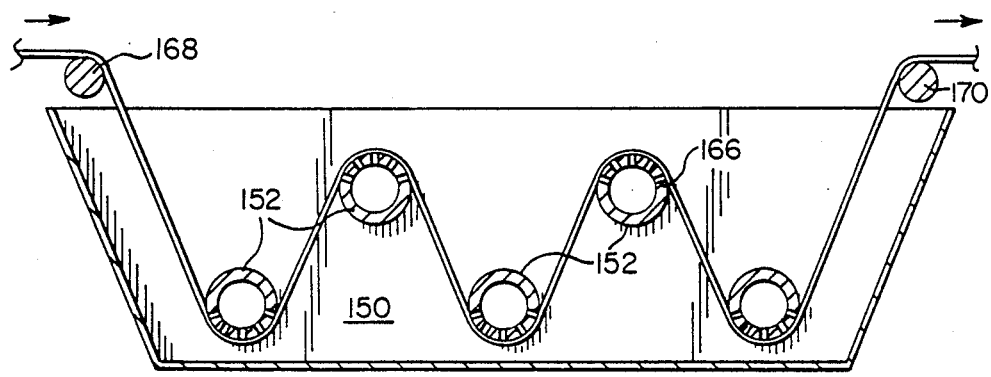
FIG. 12 is a side sectional view of the apparatus shown in FIG. 11 taken along lines 12—12.

After the aligning step, the tows are impregnated in the impregnation section 150 of FIG. 12 where the tows 108 are in a parallel side-by-side arrangement with each tow 108 abutting another tow. The sheet-like tape is then passed over a plurality of perforated stainless steel tubes 152. The impregnation bath maintained in a plurality of reservoirs 156 is pumped under a pressure maintained by pressure valves 158 through inlet tubes 160 and through the perforations 162 of the tubes 152. The perforated tubes 152 are maintained in position in section 150 by nuts 164 and 164'. The liquid impregnation bath is forced to flow between the adjoining filaments of the sheet-like tape both from above and below as it passes over and under the perforated tubes 152 thereby insuring that the fibrous bundles are thoroughly impregnated to the desired level with the impregnation bath. To insure that the maximum amount of impregnation bath is applied to the moving fibrous tows, the apertures 162 are distributed only over a radius portion 166 of the tube 152 which is in contact with the sheet-like tape. The fibrous tow passes into the impregnation section by passing over inlet positioning rod 168 and exits the impregnation section by passing over outlet positioning rod 170.

Figure 15:
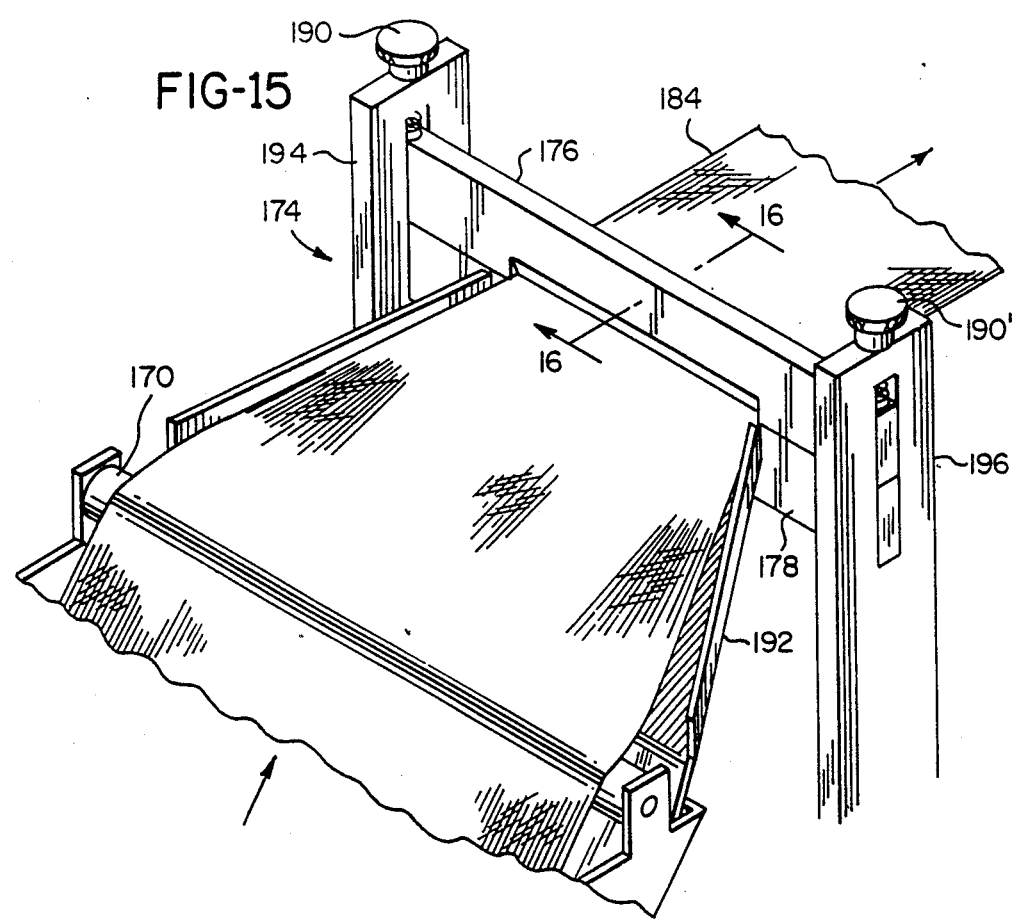
FIG. 15 is a perspective view of the die section shown in FIG. 1.

After the sheet-like tape is impregnated at station 150, it is sized to the desired form by passing through the die section 174 comprised of upper and lower die members 176 and 178 respectively. These die members have pointed sections 180 and 182, respectively, to pinch or nip the impregnated sheet-like tape 184 thereby causing excess impregnation bath 186 to remain in the impregnation section 150. By the action of the die, the impregnation bath more thoroughly impregnates the sheet-like tape. The impregnation bath acts as a lubricant as the impregnated sheet-like tape passes through die members 176 and 178. The die members maintain a pressure on the sheet-like tape by a tensioning arrangement 190 and 190'. The tensioning arrangement, of FIG. 15, permits control of at least die member 176 to adjust the spacing of pointed members 180 and 182. The impregnated tape passes into the die members 176 and 178 while passing over trough 192. The impregnation bath 186, in excess of that required for impregnation of the tape, is pinched out by the die members onto the trough 192 for return to the impregnation section 150. The die members are supported in upright members 194, 196. The overall flow of the sheet-like tape 108 to form the impregnated tape 184 is best shown in FIG. 2. The dies allow production of materials to a desired aerial weight and dimension (thickness and width).

Figure 18:
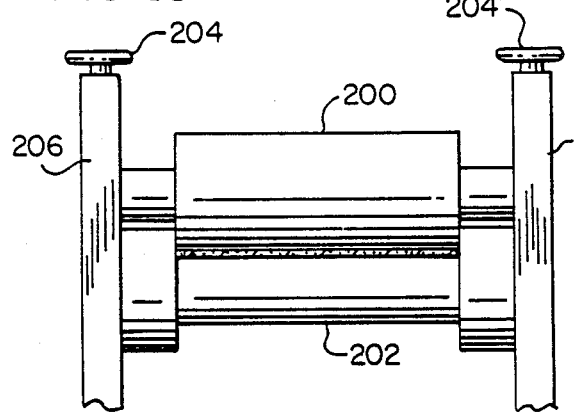
FIG. 18 is a rear view of the rollers of FIG. 17 shown along lines 18—18 thereof.
Figure 17:
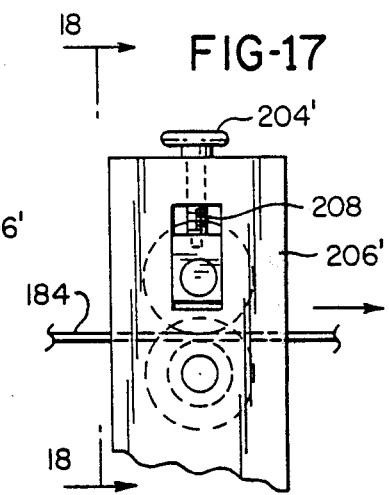
FIG. 17 is a side sectional view of a portion of the rollers shown on the left side bottom portion of FIG. 1.

After the impregnated sheet-like tape leaves the die members, it then proceeds to a series of rollers which squeeze the impregnated tape in order to fully spread the impregnation bath in, through and about the fibrous material that makes up the tape as is shown in the bottom left portion of FIG. 1, and more specifically in FIG. 18. The impregnated tape passes through a series of opposed rollers 200 and 202 maintained under tension by a tensioning device 204 and 204'. The tensioning device is arranged in upright members 206 and 206' and utilizes a threaded bolt member 208 to keep the upper roller 200 tightly against the impregnated tape 184 as the tape moves through the opposed rollers. The rollers are located in roller section 210.

After the impregnated sheet-like tape passes through roller section 210, a fine coating spray of the impregnation bath optionally is applied in the spray chamber 212. The spray chamber may or may not be used depending upon the processing characteristics desired in the impregnated sheet-like tape. In a preferred embodiment no coating is applied.

Thereafter, the impregnated tape may be dried to remove a portion of the aqueous medium of the impregnation bath in heating chamber 214 by passing the impregnated sheet-like tape between heating elements. In FIG. 19 is shown upper and lower belts 216 and 218, respectively which are continuous belts moving in the same direction and which may be perforated polymeric belts, such as Teflon polytetrafluoroethylene belts. Preferably the heating chamber maintains the temperature at an appropriate level to evaporate in a controlled manner a portion of the aqueous or volatile materials present in the impregnated sheet-like tape. It is to be appreciated that the appropriate concentration of aqueous medium in the sheet-like tape may be controlled with precision in the heating chamber. The moving belts are held in position above and below the impregnated tape 184 by use of a plurality of bars, supports or rollers 220. Electric resistance heating elements (or steam heating elements) 222 control the drying temperature in the drying unit 214. It is to be appreciated that the moisture content of the impregnated tape can vary depending on the drying time and temperature.

If desired, an effective amount of an adhesive may be sprayed in spray chamber 224 as the dried impregnated tape passes. However, in a preferred embodiment no adhesive is applied.

Subsequent to the spray chamber 224, the impregnated sheet-like tape 184 is formed into a roll 226 supported on shaft 226A. During the roll forming process, the tape is covered along top and bottom sides by protective sheet material 228. As shown in FIG. 20, a support member 231 has mounted thereon a pair of shafts 233, each of which carries a roll of the protective sheet material 229. As the tape 184 is fed to the shaft 226A, the protective sheet material in the form of webs 228 covers the top and bottom sides of the tape. The triple-ply arrangement foils the roll 226.

Figure 11:
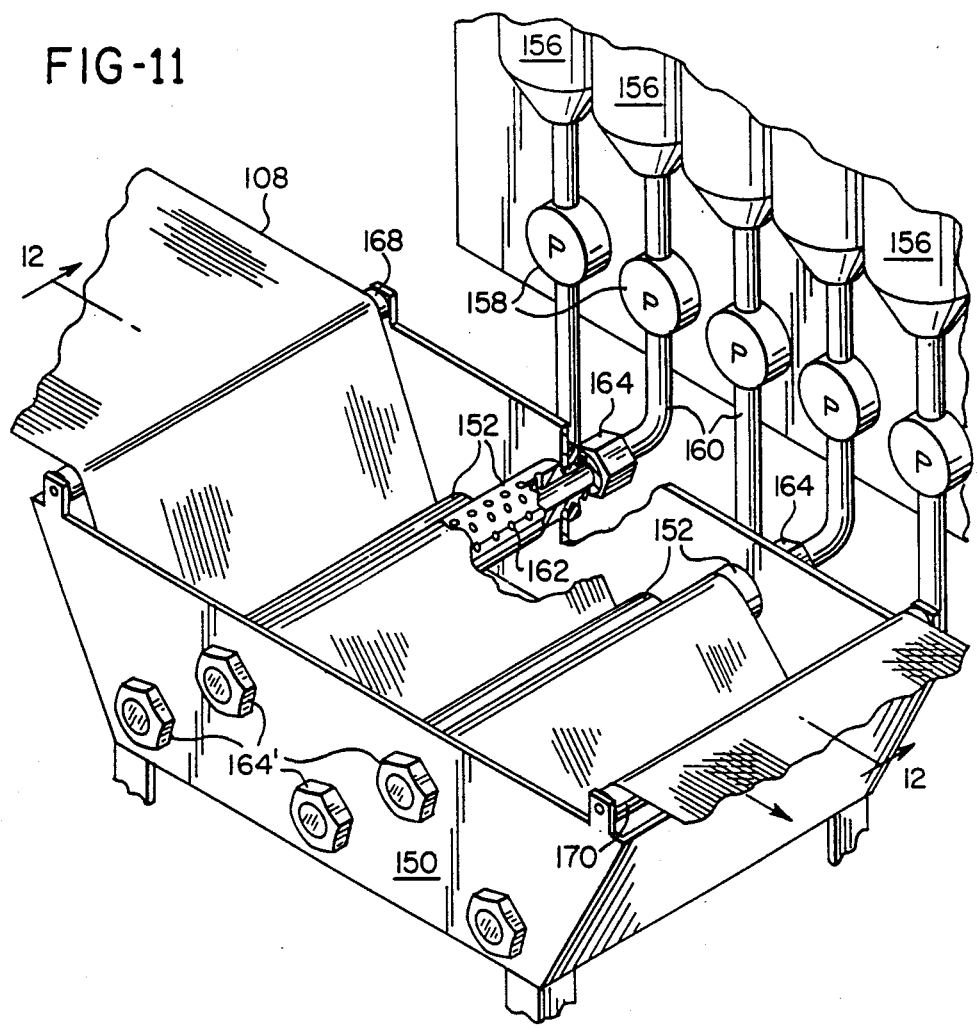
FIG. 11 is a perspective vie of the impregnation section shown in FIG. 1.
Figure 21:
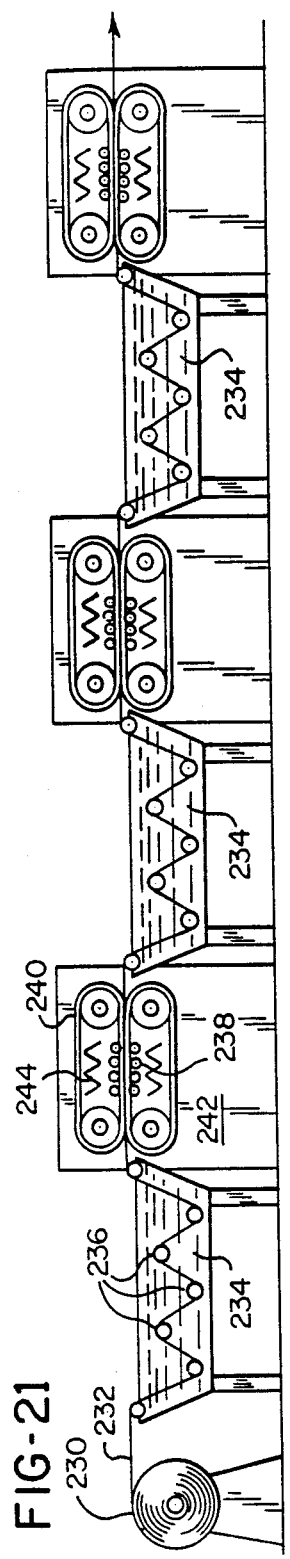
FIG. 21 is a schematic side sectional view of a preferred apparatus for impregnating cloth.

The impregnation of a preformed woven or knitted fabric comprising ends of a plurality of adjoining substantially parallel filaments is illustrated in FIG. 21. Supply roll 230 feeds fabric 232 to immersion tank 234 containing the impregnation bath as described herein. The fabric 232 passes over and under a plurality of perforated rollers 236 which are comparable to rollers 152 as best shown in FIGS. 11 and 12. After the fabric is impregnated, it passes through heating zones 242 having opposed belts 240 with supporting bars 238 and heating elements 244 comparable to that shown in FIGS. 19.

While FIG. 21 shows separate immersion tanks, it is to be appreciated that any number may be utilized as desired to appropriately impregnate the fabric. Different concentrations of particles of thermoplastic polymer may be present in the tanks to obtain the desired impregnation results. The concentration may be up to 15 percent (e.g., 10 to 15 percent) by weight of the particles of thermoplastic polymer in step 1, up to about 25 percent (e.g., 20 to 25 percent) by weight of the particles of thermoplastic polymer in step 2, and up to 35 percent (e.g., 30 to 35 percent) by weight of particles of thermoplastic polymer is step 3. The impregnated fabric leaving the final drier could then be taken up on a roller as desired.

Figure 22:
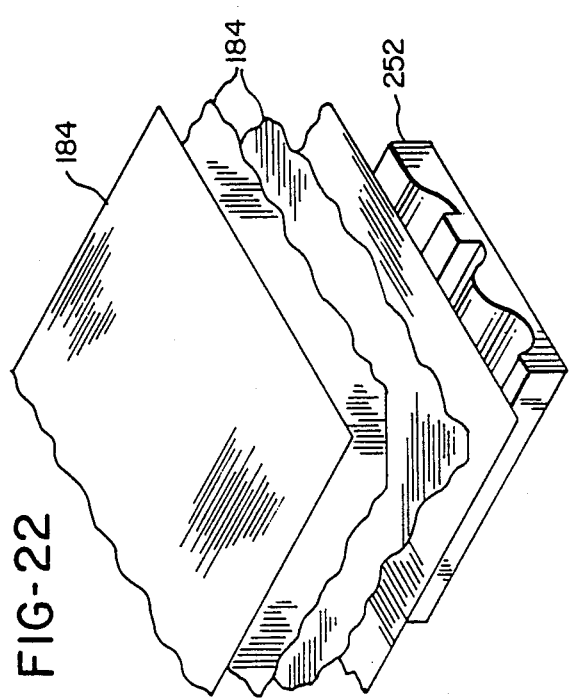
FIG. 22 is a schematic exploded view of the formation of a laminate resulting from the impregnated fibrous material of the present invention.
Figure 23:
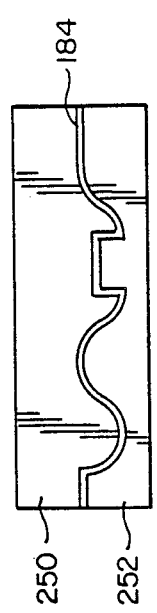
FIG. 23 illustrates the closing of the die about the laminated material when forming a composite article of a predetermined configuration.
Figure 24:
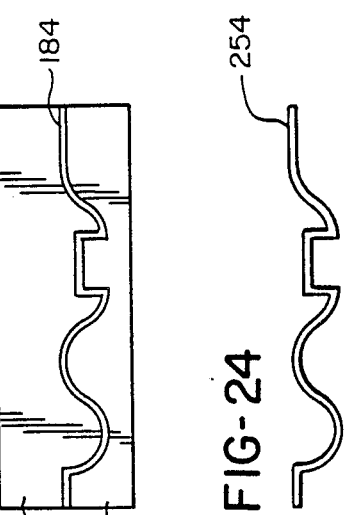
FIG. 24 is a side view of the resulting composite article.

Regardless of the technique used for preparing the impregnated fibrous material, a laminate may be prepared from the same and shaped into a desirable configuration. Because the present invention obtains a tacky and drapable product that may be shaped to a predetermined configuration in a relatively easy manner, composite articles having a complex configuration readily can be formed. For instance, a plurality of impregnated sheet-like tapes 184 such as those obtained from the apparatus as best shown in FIG. 1, can be cut to the desired size. The sheets are then placed into an opposed pair of mold members 250 and 252 as best shown in FIGS. 22 and 23. By the application of appropriate heat and pressure the final configured part 254 is obtained. The application of known mold release coatings such as silicon-based materials are generally applied prior to the insertion into mold members 250 and 252.

The final shaped part 254 is a composite laminate having useful mechanical properties. It is characterized as being lightweight, and may be used in the formation of various aerospace and automotive components.

Figure 13:
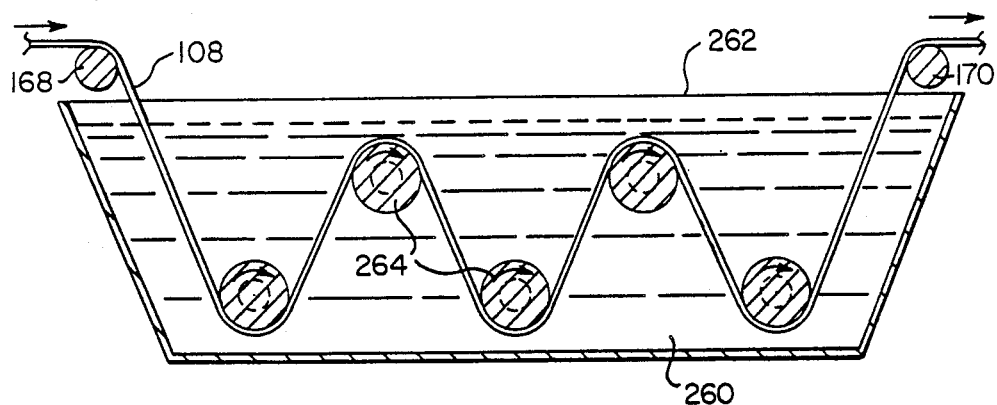
FIG. 13 is an alternative arrangement for impregnating the fibrous tow which could be substituted for that shown in FIG. 11.
Figure 14:
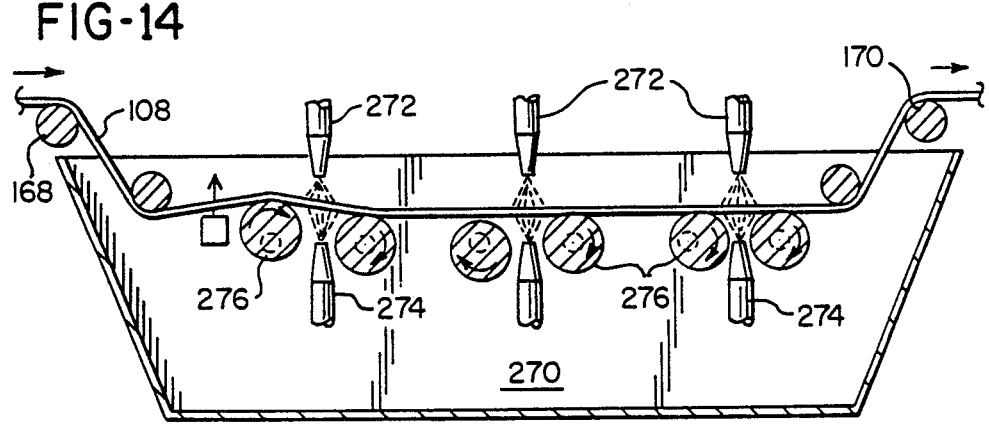
FIG. 14 is an alternative arrangement for the impregnation section which could be substituted for that shown in FIG. 11.
Figure 16:
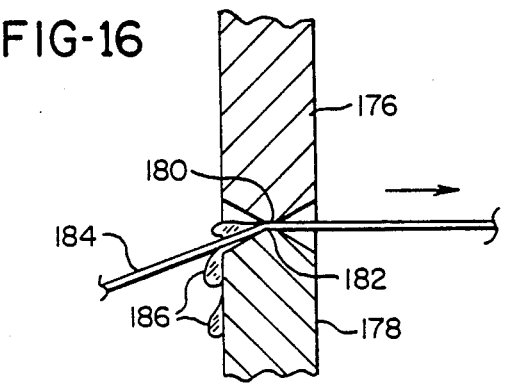
FIG. 16 is a cross-sectional view taken along line 16—16 of FIG. 15.

An alternative or a conjunctive piece of apparatus to impregnation section 150 is immersion chamber 260 with a reservoir of the impregnation bath 262 retained therein. FIG. 13 shows a series of moving rollers 264 which the fibrous sheet-like tape passes over and under. While it may be somewhat duplicative, under appropriate circumstances, one may need additional impregnation into the sheet-like tape. Accordingly, a perforated tube 152 could be used in place of one or all of the rollers 264 as shown in immersion chamber 260. An alternative embodiment to the use of the perforated roller 152 would be to spray the fibrous tow in spray chamber 270 as shown in FIG. 14. Spray members 272 and 274 could be utilized to spray the impregnation bath above and below the fibrous sheet-like tape as it moves through the chamber. Again rollers 276 could be configured to be perforated such as perforated roller 152 shown in FIG. 11.

Figure 25:
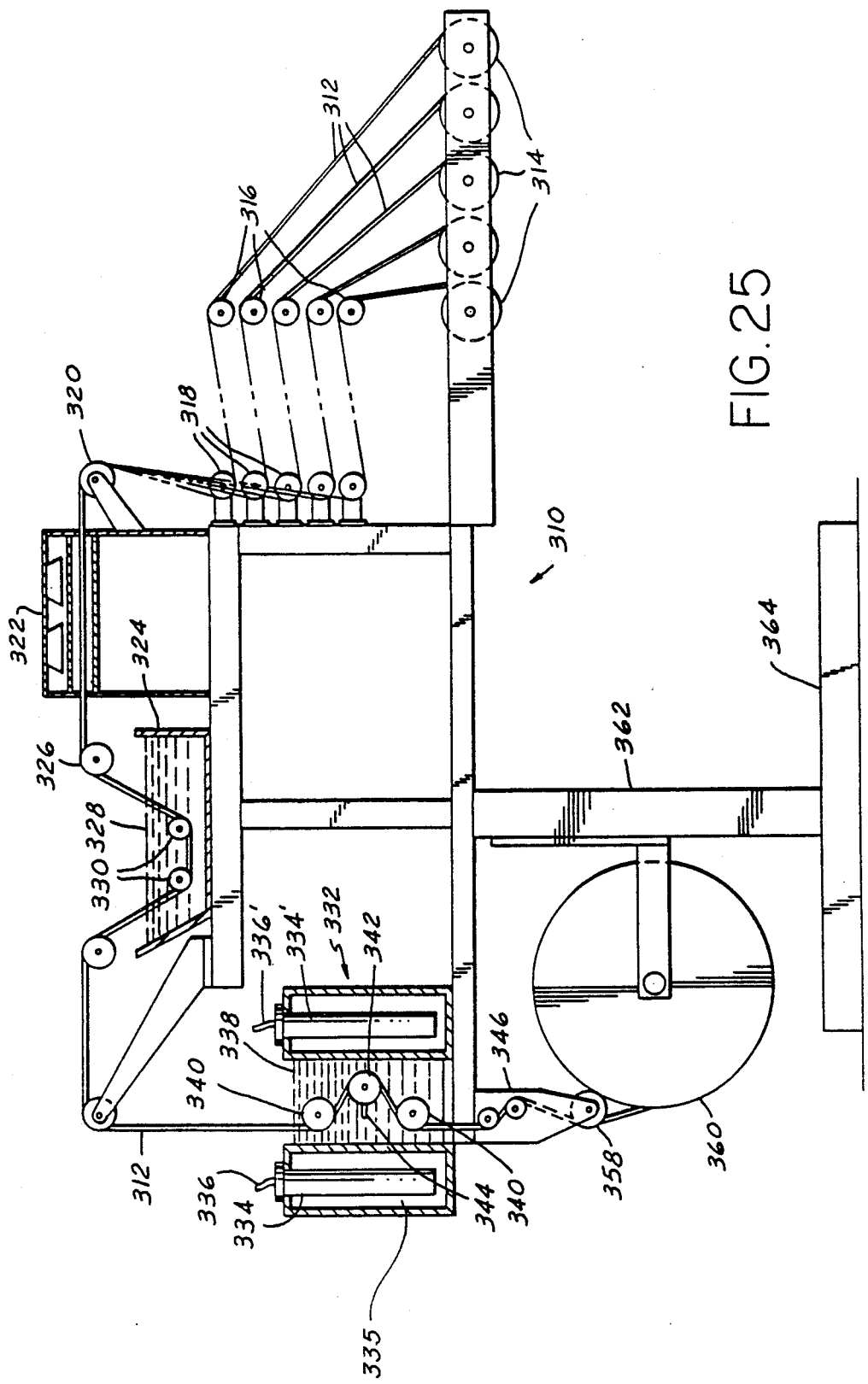
FIG. 25 is a schematic drawing of another preferred apparatus for impregnating tows in accordance with the improved process of the present invention.

A further apparatus to impregnate to fibrous material is illustrated in FIGS. 25 to 29. FIG. 25 is a schematic diagram of an overall apparatus to be utilized in the present invention. A plurality of tows 312 are fed to the impregnating apparatus 310 from spools 314. A particularly preferred tow would contain 12,000 substantially parallel carbon filaments per tow of Celion carbon fibers available from BASF Structural Materials, Inc., Charlotte, N.C., U.S.A. Approximately 60 spools can be provided at position 314. The tow is maintained under tension between rollers 316, 318 and introductory roller 320. A heating chamber 322 volatilizes any sizing that may be present on the tow. A temperature range in the heating chamber 322 may be from 400° C. to 925° C., preferably about 600° C. In addition to or as an alternative to heating chamber 322, the tow can be passed over roller 326 and through a solvent reservoir 324. The solvent therein could be used to remove any sizing agent that may be present. Suitable solvents would be the aromatic, chlorinated aliphatic and heterocyclic materials such as methylethyl ketone, methylene chloride, acetone, xylene, methylpyrrolidone. Rollers 330 underneath the level of solvent 328 may be adjusted to provide an appropriate residence time in the solvent tank.

After the fibrous material leaves the solvent tank, it is then impregnated with the impregnation bath. A number of different techniques can be utilized to accomplish the desired impregnation through the application of work. The only requirement is that the impregnation bath well flow between adjoining filaments. The objective is to have as minimal voids as possible, i.e., minimal portions of the tow that are not in contact with particulate thermoplastic polymer.

FIG. 25 shows the tow 312 being immersed from top to bottom in an immersion tank of chamber 332 which includes heating elements 334 and 334' for bath temperature control positioned in heat element chambers 335 and having respective wire leads 336 and 336'. The fibrous material 312 as it proceeds through the impregnation bath 338 is wound about multiple rollers 340 and 342. Roller 342 slides in slot 344 back and forth to permit appropriate tension on the fibrous material. Also, the roller 342 may be replaced by a bar arrangement which would permit the filaments of the fibrous material to be spread out on the bar, thereby permitting the thermoplastic polymer to further surround the filaments. Also, there may be multiple bars that can take the place of roll 342 variously placed in the immersion tank of chamber 332. Further, utilization of ultrasonic equipment attached to either the rollers and/or the bars would permit further surrounding of the tow with the impregnation bath thereby improving the impregnation. The ultrasonic equipment causes movement of the fibers and the particles of thermoplastic polymer thereby increasing the impregnation of the fibrous material. The ultrasonic equipment is readily available in the industry, such as Sonicator ultrasonic equipment, commercially available from Heat Systems, Inc. of Farmingdale, N.Y., U.S.A.

When utilizing the apparatus shown in FIG. 25, the fibrous material passes from the immersion tank of chamber 332 through a die (shown in FIGS. 28 and 29) which will size the fibrous material. Shown in FIG. 25 is a heating chamber 346 which can control the temperature of the tow as it leaves the heated impregnation tank or chamber. In this case one may be able to dry the impregnated fibrous material to a particular aqueous medium content, in a controlled manner. The resulting fibrous material is then ready for take-up on take-up roll 360 after passing over introductory roller 358.

The tows impregnated through the use of the equipment heretofore described instead of being a collection of individual filaments take on the shape of a tape or sheet. Such tape or sheet can vary in size. Even if a narrow tape is prepared, the tape adheres well on a roller due to the tacky nature of the resulting impregnated fibrous material to an adjacent wrap which is laid next to it in a side-by-side relationship. The dissolved polymeric binding agent (previously described) assists in adhering the thermoplastic particles to the filaments as well as within tows which comprise the tape. Due to the complete impregnation of the fibrous material with the impregnation bath, the resulting product is "drapable", that is, it has the ability to hang or stretch out loosely and is capable of being readily easily folded. By having this drapable capability, the multiple tows now in the sheet-like form can be shaped to any desired configuration, such as in a die for forming a bulk head door of an aircraft. Once in the die, it can be molded at an appropriate temperature and pressure. Other aircraft end uses could be landing gear doors, cowl components, wing to body fairing, outboard ailerons, stabilizer tips, rudders, elevator wings, fuselage, and the like.

Since the apparatus that can be utilized to impregnate the fibrous material shown in FIG. 25 is relatively light, it can be affixed to an upright member 362 which is connected to a supporting stand 364.

Figure 28:
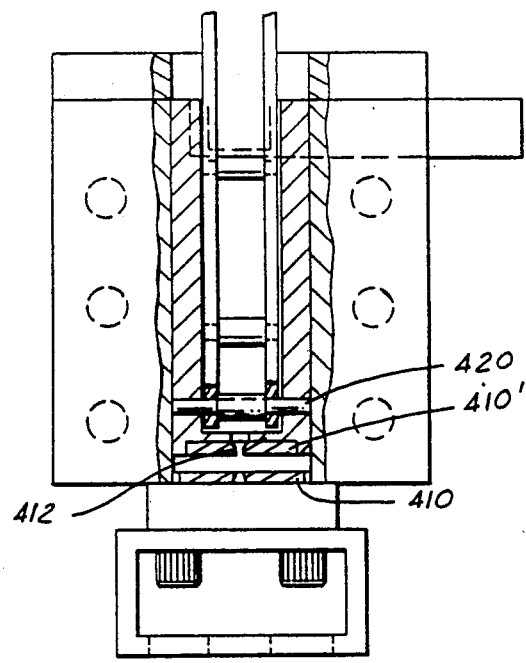
FIG. 28 is a side sectional view of the immersion means useful in the present invention.
Figure 29:
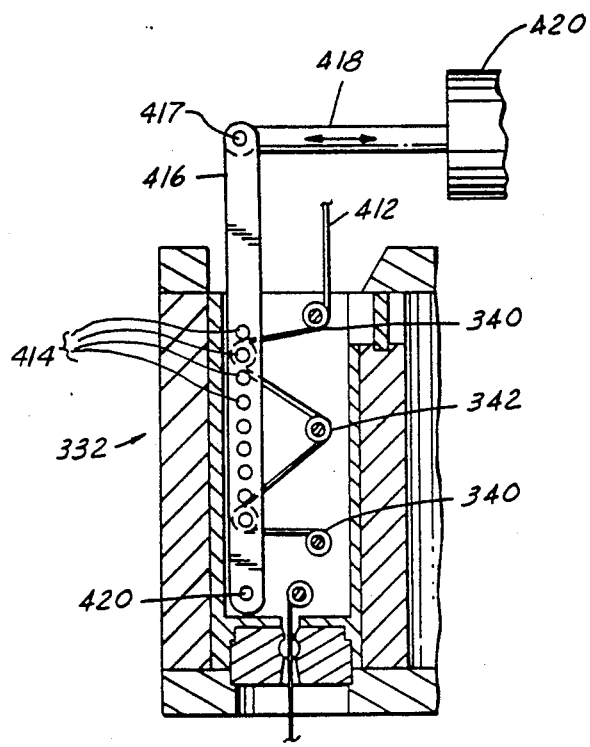
FIG. 29 is a sectional view of the immersion means useful in the present invention.

Since some of the thermoplastic polymers that may be useful in the present process are expensive, it has been found to be desirable to retain the impregnation bath that is applied to the tow in an immersion tank or chamber that has multiple chambers such as that shown in FIG. 26, which is a top view of the chamber 332. Shown on the left side of the apparatus is the chamber 370 in which the impregnation bath 338 is retained. The chamber comprises a top member 372 and a bottom member 374 which are bolted together by threaded fastener means 376 and 378 with the face means 380, best shown in FIG. 27, having the sides 382 secured by similar fastening members 384 and 386. Basically, the operation of the multi-chambered immersion tank or chamber permits the impregnation bath used to impregnate the fibrous material, to be pumped through pump 390 through inlet 392 into a first reservoir 394. A piston having a head 396 is pressed down through the chamber 394 by a handle or rod 398. A conduit 400 connects the reservoir 394 with reservoir chamber 402. The handle 398 is biased open by spring 405. The material that is present in chamber 402 can be passed into the contact chamber 370 by means of piston rod 404 which acts similar to piston rod 398 in the first reservoir chamber. In this fashion, the impregnation bath is maintained at an appropriate level by means of weir 403 which serves to connect and disconnect the chambers 394 and 402. Shaping die 410, is best shown in FIG. 28 which is comprised of aligned aperture 412 in cooperating elements 410 and 410'.

To facilitate the appropriate-tension within the chamber 332 the rollers 340 may have cooperating bars or rollers 414 placed on a manifold 416 which can be adjusted to a desired tension by movement of bar member 418 which pivots at point 417. Use of ultrasonic techniques can likewise be applied to manifold 416 as could be applied to the bar that could take the place of roller 342 as discussed previously. Bar 418 would in turn be attached to servomotor 420 for frequent movement of the bar and manifold about pivot 417 as desired. Weir 424 operates in a similar fashion to weir 403 and are movable in and out of position by means of handles 426 and 428, respectively. The weirs can be slid in and out of position to permit the material to flow from one chamber to the other and into the immersion tank or chamber 370. The rod 404 is biased open by spring 405'.

The following examples are presented as specific illustrations of the claimed invention. It should be understood, however, that the invention is not limited to the specific details set forth in the examples.

EXAMPLE I 1045 grams of solid particles of polyetheretherketone thermoplastic polymer are dry blended with 64 grams of solid particles of water-soluble polyacrylic acid binding agent possessing a molecular structure which is cross-linked with polyalkenyl polyether. The polyetheretherketone is commercially available from Imperial Chemical Industries, London, England, as Grade 450 KX1033 Victrex polymer, possesses a glass transition temperature of approximately 143° C., and possesses a melting temperature of approximately 343° C. The polyetheretherketone is ground to a mean particle size of 18 microns with the largest particle size being 90 microns. The water-soluble binding agent is commercially available from B. F. Goodrich as Grade 910 Carbopol polymer and has a molecular weight of approximately 750,000.

An alkyl phenoxypolyethoxy ethanol surfactant in a quantity of 1.2 grams is dissolved in 4800 grams of distilled water and the blend of solid particles of thermoplastic polymer and water-soluble binding agent are added while present in an impeller agitator operating at a moderate speed. The surfactant is commercially available from Rohm and Haas Company as Triton X100 surfactant. Such mixing is conducted for two hours in order to completely dissolve the water-soluble binding agent and to disperse the particles of thermoplastic polymer. The pH of the resulting dispersion is found to be 2.7. The viscosity of the dispersion is found to be 6,000 cps. when measured with a Rheometrics Stress Rheometer (Model RSR/M) while operating at a shear rate of 0.01 reciprocal second. The Brookfield Yield Value of the dispersion is found to be 4.3 dynes/cm.$^2$ when tested on a Brookfield RVT viscometer as previously described.

140 grams of a 10 percent sodium hydroxide solution next are added to the dispersion while undergoing moderate agitation. This raises the pH of the dispersion to 6.1 to form an improved gelled impregnation bath wherein the viscosity of the resulting bath is substantially increased to approximately 81,000 cps. (as measured with a Rheometrics Stress Rheometer (Model RSR/M) at a shear rate of 0.01 reciprocal second) through an extension of the molecules of the dissolved binding agent. The resulting impregnation bath exhibits plastic flow with shear-thinning behavior. The Brookfield Yield Value of the dispersion is found to be 56 dynes/cm.$^2$ when tested on a Brookfield RVT viscometer as previously described. It can be calculated as previously described that the Minimum Brookfield Yield Value required to suspend the largest particles of thermoplastic polymer present in the dispersion is 9.4 dynes/cm.$^2$. Accordingly, the resulting impregnation bath is highly stable and the actual Brookfield Yield Value exceeds the calculated Minimum Brookfield Yield Value to suspend even the largest thermoplastic polymer particles present by more than 5 times.

The resulting impregnation bath is next poured into an impregnation apparatus similar to that illustrated in FIG. 25 containing several stationary non-rotating bars immersed within the bath.

A tow of approximately 12,000 substantially continuous Celion carbon filaments in unsized form available from BASF Structural Materials, Inc., under the designation G30-500 is selected to serve as the fibrous reinforcement. The filaments of the tow possess a diameter of approximately 7 microns. This tow is fed in the direction of its length from a single bobbin located on a tension controlled creel, and while under tension is passed through the impregnation bath while coming in contact with the stationary non-rotating bars immersed within the bath. Following passage over the bars the multifilamentary tow is passed through a rectangular metallic die situated at the bottom of the impregnation bath having polished surfaces. While passing over the bars and through the die the substantially parallel carbon filaments are impregnated with the impregnation bath as the bath is caused to flow between adjoining filaments. Such flow inherently results in a significant reduction in the viscosity of the impregnation bath which greatly aids in the incorporation of the solid polymer particles between the carbon filaments. Once the flow is discontinued the thermoplastic polymer particles tend to be locked within the fibrous material in a highly uniform manner. The die also aids in the control of the width and thickness of the resulting impregnated tow.

The resulting impregnated tow is next wound on a rotating drum using a transversing laydown guide to form a rectangular sheet having a width of approximately 30.5 cm.

It is found that the resulting sheet product following drying for two hours at ambient conditions to remove a portion of the water contains approximately 26.5 percent carbon fibers by weight, approximately 15.5 percent solid thermoplastic polymer particles by weight, approximately 0.8 percent binding agent by weight, and approximately 57.2 percent water by weight. This product contains the matrix-forming thermoplastic polymer particles substantially uniformly dipersed between adjoining fibers in the absence of fusion bonding and can be handled without the segregation of the particles. When tested in accordance with the drape test of ASTM D-1388 the product is found to be highly drapable both in the 0° and 90° directions and to exhibit a flexural rigidity of approximately 10,000 mg. cm. Also, the product is tacky and is found to pass the tack test of NASA Technical Bulletin 1142.

Next, the product while in a flat configuration is allowed to substantially completely dry to a water content of approximately 2 percent while at ambient conditions while containing the thermoplastic polymer particles well bound therein. Twelve flat piles containing approximately 36.9 percent by weight of the thermoplastic particles measuring approximately 30.5 cm.×30.5 cm. are laid up in the 0° direction in a matched metal mold at room temperature conditions and placed in a platen press. The mold is heated to 290° C. with no applied pressure, and is held at 290° C. for 60 minutes with no applied pressure in order to allow volatiles to escape. A pressure of 2.1 MPa next is applied and the temperature is gradually raised to 385° C. where it is held for another 60 minutes. The mold is then cooled to 50° C. while continuing to maintain the 2.1 MPa pressure. The mold finally is removed from the press and the resulting composite article in the form of a panel is removed from the mold.

Alternatively, it would be possible to lay up the impregnated fibrous material prior to drying while still in the wet tacky form. Under such conditions the open mold containing the plies initially could be heated at approximately 120° to 150° C. for approximately 1 hour in the absence of pressure to further assist in the removal of volatiles. Such procedure would be particularly advantageous when forming a composite article of a more complex configuration wherein drape and tack are of greater importance.

The resulting panel formed from the impregnated product which is dried prior to placing in the mold has a thickness of 0.189±0.004 cm., a theoretical carbon fiber volume of 55.5 percent, and a void content of less than 0.5 percent.

Test specimens are cut from the panel and four point, 0° flexural tests are conducted in accordance with ASTM D790-84a, Method II, Procedure A, using a span-to-depth ratio of approximately 32:1 and a crosshead speed of approximately 0.5 cm./minute. A 0° flexural strength of 1500 MPa is exhibited which represents a 70 percent translation of that theoretically attainable. A 0° flexural modulus of 123 GPa is exhibited which represents a 90 percent translation of that theoretically attainable.

EXAMPLE II

Example I is substantially repeated with the exceptions indicated.

1133 grams of solid particles of a polyetheretherketone thermoplastic polymer are dry blended with 48 grams of the solid particles of the water-soluble polyacrylic acid binding agent possessing a molecular structure which is cross-linked with polyalkenyl polyether. The polyetheretherketone is commercially available from Imperial Chemical Industries, as Grade 380 KX1032 Victrex polymer. The polyetheretherketone is ground to a mean particle size of 14 microns with the largest particle size being 75 microns.

The surfactant is dissolved in 3400 grams of distilled water, and the pH of the dispersion initially produced is 3.2. This initial dispersion has a viscosity of 12,000 cps., and its Brookfield Yield Value is 7.5 dynes/cm.$^2$.

Upon the addition of 118 grams of a 10 percent sodium hydroxide solution the pH is raised to 6.0, and the viscosity of the resulting impregnation bath is raised to 205,000 cps. The Brookfield Yield Value is found to be 90 dynes/cm.$^2$. It can be calculated that the Minimum Brookfield Yield Value required to suspend the largest particles is approximately 8.5 dynes/cm.$^2$. Accordingly, the resulting impregnation bath is highly stable and the actual Brookfield Yield Value exceeds the calculated Minimum Brookfield Yield Value to suspend even the largest thermoplastic polymer particles present by more then 10 times.

The resulting sheet product following drying for two hours at ambient conditions to remove a portion of the water contains approximately 26.6 percent carbon fibers by weight, approximately 15.4 percent solid thermoplastic particles by weight, approximately 0.8 percent binding agent by weight, and approximately 57.2 percent water by weight. This product contains the matrix-forming thermoplastic polymer particles substantially uniformly dispersed between adjoining fibers in the absence of fusion bonding and can be handled without the segregation of the particles. When tested in accordance with the drape test of ASTM D-1388 the product is found to be highly drapable both in the 0° and 90° directions and to exhibit a flexural rigidity of approximately 10,000 mg.cm. Also, the product is tacky and is found to pass the tack test of NASA Technical Bulletin 1142.

The product while in a flat configuration is allowed to substantially completely dry to a water content of approximately 2 percent while at ambient conditions while containing the thermoplastic polymer particles well bound therein. Twelve flat piles containing approximately 36.6 percent by weight of the thermoplastic particles measuring approximately 30.5 cm.×30.5 cm. are laid up in the 0 direction in the matched metal mold at room temperature conditions and placed in a platen press. The mold is heated to 290° C. with no applied pressure, and is held at 290° C. for 60 minutes with no applied pressure in order to allow volatiles to escape. A pressure of 1.4 MPa next is applied and the temperature is gradually raised to 370° C. where it is held for another 60 minutes. The mold is then cooled to 50° C. while continuing to maintain the 1.4 MPa pressure. The mold finally is removed from the press and the resulting composite article in the form of a panel is removed from the mold.

The resulting panel formed from the impregnated product which is dried prior to placing in the mold has a thickness of 0.180±0.001 cm., a theoretical carbon fiber volume of 55.8 percent, and a void content of less than 0.5 percent.

Test specimens are cut from the panel and are evaluated. A 0° flexural strength of 1340 MPa is exhibited which represents a 62 percent translation of that theoretically attainable. A 0° flexural modulus of 113 GPa is exhibited which represents a 87 percent translation of that theoretically attainable.

EXAMPLE III

Example I is substantially repeated with the exceptions indicated.

960 grams of solid particles of polyimide thermoplastic polymer are dry blended with 77 grams of the solid particles of the water-soluble polyacrylic acid binding agent possessing a molecular structure which is cross-linked with polyalkenyl polyether. The polyimide is 97 percent imidized and is commercially available from Mitsui Toatsu Chemicals, Inc. of Tokyo, Japan, as LARC-TPI polymer, and initially possesses a melting temperature of approximately 270° C. The polyimide is ground to a mean particle size of 3.4 microns with the largest particle size being 32 microns. The specific polyimide thermoplastic selected is capable of undergoing a linear condensation reaction upon heating.

The surfactant is dissolved in 5440 grams of distilled water, and the pH of the dispersion initially produced is 2.7. This initial dispersion has a viscosity of 2,500 cps., and its Brookfield Yield Value is 1.5 dynes/cm.$^2$.

Upon the addition of 160 grams of a 10 percent sodium hydroxide solution the pH is raised to 5.4, and the viscosity of the resulting impregnation bath is raised to 53,000 cps. The Brookfield Yield Value is found to be 20 dynes/cm.$^2$. It can be calculated that the Minimum Brookfield Yield Value required to suspend the largest particles is approximately 6.0 dynes/cm.$^2$. Accordingly, the resulting impregnation bath is highly stable and the actual Brookfield Yield Value exceeds the calculate Minimum Brookfield Yield Value to suspend even the largest thermoplastic polymer particles present by more than 3 times.

The resulting sheet product following drying for two hours at ambient conditions to remove a portion of the water contains approximately 27.4 percent carbon fibers by weight, approximately 14.6 percent soli thermoplastic particles by weight, approximately 0.8 percent binding agent by weight, and approximately 57.2 percent water by weight. This product contains the matrix-forming thermoplastic polymer particles substantially uniformly dispersed between adjoining fibers in the absence of fusion bonding and can be handled without the segregation of the particles. When tested in accordance with the drape test of ASTM D-1388 the product is found to be highly drapable both in the 0° and 90° directions and to exhibit a flexural rigidity of approximately 10,000 mg.cm. Also, the product is tacky and is found to pass the tack test of NASA Technical Bulletin 1142.

The product while in a flat configuration is allowed to substantially completely dry to a water content of approximately 2 percent while at ambient conditions while containing the thermoplastic polymer particles well bound therein. Twelve flat piles containing approximately 34.8 percent by weight of the thermoplastic particles measuring approximately 30.5 cm.×30.5 cm. are laid up in the 0° direction in a matched metal mold at room temperature conditions and placed in a platen press. The mold is heated to 260° C. with no applied pressure, and is held at 260° C. for 30 minutes with no applied pressure in order to allow volatiles to escape. A pressure of 1.4 MPa next is applied and the temperature is gradually raised to 343° C. where it is held for another 60 minutes. The mold is then cooled to 50° C. while continuing to maintain the 1.4 MPa pressure. The mold finally is removed from the press and the resulting composite article in the form of a panel is removed from the mold.

During the composite formation the polyimide becomes fully imidized and the glass transition temperature becomes approximately 240° C., and the melting temperature becomes approximately 340° C.

The resulting panel formed from the impregnated product which is dried prior to placing in the mold has a thickness of 0.187±0.003 cm., a theoretical carbon fiber volume of 59.6 percent, and a void content of less than 2.0 percent.

Test specimens are cut from the panel and four point, 0° flexural tests are conducted in accordance with ASTM D790-84a, Method II, Procedure A, using a span-to-depth ratio of approximately 32:1 and a crosshead speed of approximately 0.5 cm./minute. A 0° flexural strength of 1640 MPa is exhibited which represents a 71 percent translation of that theoretically attainable. A 0° flexural modulus of 116 GPa is exhibited which represents a 84 percent translation of that theoretically attainable.

Although the invention has been described with preferred embodiments, it is to be understood that variations and modifications may be employed without departing from the concept of the invention as defined in the following claims.

We claim:

1. A method for the production of an improved fibrous material suitable for the formation of a substantially void-free composite article comprising a plurality of adjoining substantially parallel reinforcing filaments in association with a matrix-forming thermoplastic polymer comprising:
   (a) preparing a dispersion of solid particles of a thermoplastic polymer in an aqueous medium which contains an effective amount of a dissolved polymeric binding agent,
   (b) substantially increasing the viscosity of said dispersion to form an improved impregnation bath whereby the viscosity of the resulting bath becomes at least 50,000 cps. and said impregnation bath has a plastic flow characteristic with shear-thinning behavior which is sufficient to substantially uniformly suspend said particulate thermoplastic polymer within said bath,
   (c) impregnating said adjoining substantially parallel reinforcing filaments with said bath under conditions wherein said bath is caused to flow between said adjoining filaments by the application of work wherein said bath flow inherently results in a reduction of the viscosity of said bath which aids in the incorporation of said particulate thermoplastic polymer between adjoining filaments, and
   (d) controlling the content of said aqueous medium in the resulting fibrous material to provide a product having said particles of matrix-forming thermoplastic polymer substantially uniformly dispersed between adjoining filaments in the absence of fusion bonding which inherently (1) is drapable and tacky at ambient conditions, (2) is handleable without segregation of said particles within the fibrous material, and (3) which upon the application of heat and pressure can be transformed into a substantially void-free fiber-reinforced composite article of a predetermined configuration wherein said solid particles form the matrix phase.

2. A method in accordance with to claim 1 wherein said plurality of adjoining substantially parallel reinforcing filaments are provided as a single end.

3. A method in accordance with claim 1 wherein said fibrous material comprises a plurality of ends each comprising a plurality of substantially parallel reinforcing filaments.

4. A method in accordance with claim 1 wherein said fibrous material is in the configuration of a cloth which incorporates a plurality of ends each comprising a plurality of substantially parallel reinforcing filaments.

5. A method in accordance with claim 1 wherein said reinforcing filaments are selected from the group consisting of carbon, glass, aramid, silicon carbide, silicon nitride, boron nitride, and mixtures of the foregoing.

6. A method in accordance with claim 1 wherein said reinforcing filaments are carbon filaments.

7. A method in accordance with claim 1 wherein said reinforcing filaments are glass filaments.

8. A method in accordance with claim 1 wherein said thermoplastic polymer is selected from the group consisting of polyethylenes, polypropylenes, polyesters, polyamides, polyvinyl chlorides, polystyrenes, polycarbonates, polyoxymethylenes, and mixtures of the foregoing.

9. A method in accordance with claim 1 wherein said solid particles of thermoplastic polymer possess a particle size within the range of approximately 0.1 to 100 microns.

10. A method in accordance with claim 1 wherein said dissolved polymeric binding agent is provided in step (a) in a concentration of approximately 0.01 to 5 percent by weight based upon the total weight of the dispersion.

11. A method in accordance with claim 1 wherein said solid particles of said thermoplastic polymer are provided in said dispersion of step (a) in a concentration of approximately 5 to 50 percent by weight based upon the total weight of the dispersion.

12. A method in accordance with claim 1 wherein said dispersion provided in step (a) additionally includes a surfactant in a minor concentration to aid in the wetting of said particles of thermoplastic polymer.

13. A method in accordance with claim 1 wherein the viscosity of said dispersion is increased in step (b) through the addition of an agent which interacts with said dissolved polymeric binding agent.

14. A method in accordance with claim 13 wherein the viscosity of said dispersion is increased in step (b) through the addition of an agent which adjusts the pH.

15. A method in accordance with claim 1 wherein said viscosity is raised at least 50 percent in step (b) to at least 50,000 cps.

16. A method in accordance with claim 1 wherein said viscosity is raised in step (b) to between approximately 50,000 to 3,000,000 cps.

17. A method in accordance with claim 1 wherein said viscosity is raised in step (b) to between approximately 50,000 to 250,000 cps.

18. A method in accordance with claim 1 wherein said impregnation bath formed in step (b) possesses a Brookfield Yield Value above the minimum value required to permanently suspend the largest particles of said thermoplastic polymer present in said bath.

19. A method in accordance with claim 1 wherein said impregnation of step (c) is carried out while said reinforcing filaments are immersed in said bath and said work is applied as said filaments while under tension are passed in contact with at least one solid member.

20. A method in accordance with claim 1 wherein said impregnation step (c) is carried out by passing said substantially parallel reinforcing filaments in contact with the outer surface of at least one perforated tube through which said bath is forced.

21. A method in accordance with claim 1 wherein in step (d) said concentration of aqueous medium in said resulting fibrous material is controlled within the range of approximately 10 to 70 percent by weight.

22. A method in accordance with claim 1 wherein in step (d) said resulting fibrous material is dried to remove a portion of the aqueous medium.

23. A method in accordance with claim 1 wherein in step (d) said resulting fibrous material is dried to remove at least a portion of the aqueous medium and additional aqueous medium subsequently is applied thereto in order to maintain the recited characteristics.

24. A method in accordance with claim 1 wherein the product of step (d) contains said particles of matrix-forming thermoplastic polymer in a concentration of approximately 6 to 45 percent by weight.

25. A method in accordance with claim 1 which further comprises the step of applying an adhesive to the impregnated fibrous material following step (d).

26. A method for the production of an improved fibrous material suitable for the formation of a substantially void-free composite article comprising a plurality of adjoining substantially parallel reinforcing filaments in association with a matrix-forming high performance engineering thermoplastic polymer comprising:
(a) preparing a dispersion of solid particles of a high performance engineering thermoplastic polymer in an aqueous medium which contains an effective amount of a dissolved polymeric binding agent,
(b) substantially increasing the viscosity of said dispersion to form an improved impregnation bath whereby the viscosity of the resulting bath becomes at least 50,000 cps. and said impregnation bath has a plastic flow characteristic with shear-thinning behavior which is sufficient to substantially uniformly suspend said particulate high performance engineering thermoplastic polymer within said bath,
(c) impregnating said adjoining substantially parallel reinforcing filaments with said bath under conditions wherein said bath is caused to flow between said adjoining filaments by the application of work wherein said bath flow inherently results in a reduction of the viscosity of said bath which aids in the incorporation of said particulate high performance engineering thermoplastic polymer between adjoining filaments, and
(d) controlling the content of said aqueous medium in the resulting fibrous material to provide a product having said particles of matrix-forming high performance engineering thermoplastic polymer substantially uniformly dispersed between adjoining filaments which inherently (1) is drapable and tacky at ambient conditions, (2) is handleable without segregation of said particles within the fibrous material, and (3) which upon the application of heat and pressure can be transformed into a substantially void-free fiber-reinforced composite article of a predetermined configuration wherein said solid particles form the matrix phase.

27. A method in accordance with claim 26 wherein said plurality of adjoining substantially parallel reinforcing filaments are provided as a single end.

28. A method in accordance with claim 26 wherein said fibrous material comprises a plurality of ends each comprising a plurality of substantially parallel reinforcing filaments.

29. A method in accordance with claim 26 wherein said fibrous material is in the configuration of a cloth which incorporates a plurality of ends each comprising a plurality of substantially parallel reinforcing filaments.

30. A method in accordance with claim 26 wherein said reinforcing filaments are selected from the group consisting of carbon, glass, aramid, silicon carbide, silicon nitride, boron nitride, and mixtures of the foregoing.

31. A method in accordance with claim 26 wherein said reinforcing filaments are carbon filaments.

32. A method in accordance with claim 26 wherein said reinforcing filaments are glass filaments.

33. A method in accordance with claim 26 wherein said high performance engineering thermoplastic polymer exhibits a glass transition temperature above 80° C. and a melting temperature above 150° C.

34. A method in accordance with claim 26 wherein said high performance engineering thermplastic polymer exhibits a distinct molten phase when heated in the absence of a cross-linking agent.

35. A method in accordance with claim 26 wherein said solid particles of said high performance engineering thermoplastic polymer exhibit sintering when heated and are capable of undergoing consolidation when adjoining particles are heated under pressure.

36. A method in accordance with claim 26 wherein said high performance engineering thermoplastic polymer is selected from the group consisting of polysulfones, polyether sulfones, polyphenylene oxides, polyetherimides, anisotropic melt-forming polyesters, anisotropic melt-forming polyesteramides, anisotropic melt-forming polycarbonates, polycarbonates, polyimides, polyamideimides, polyimidesulfones, polyarylenesulfides, polyaryleneetherketones, and mixtures of the foregoing.

37. A method in accordance with claim 26 wherein said solid particles of high performance engineering thermoplastic polymer possess a particle size within the range of approximately 0.1 to 100 microns.

38. A method in accordance with claim 26 wherein said dissolved polymeric binding agent is provided in step (a) in a concentration of approximately 0.01 to 5 percent by weight based upon the total weight of the dispersion.

39. A method in accordance with claim 26 wherein said solid particles of high performance engineering thermoplastic polymer are provided in said dispersion of step (a) in a concentration of approximately 5 to 50 percent by weight based upon the total weight of the dispersion.

40. A method in accordance with claim 26 wherein said dispersion provided in step (a) additionally includes a surfactant in a minor concentration to aid in the wetting of said particles of high performance engineering thermoplastic polymer.

41. A method in accordance with claim 26 wherein the viscosity of said dispersion is increased in step (b) through the addition of an agent which interacts with said dissolved polymeric binding agent.

42. A method in accordance with claim 41 wherein the viscosity of said dispersion is increased in step (b) through the addition of an agent which adjusts the pH.

43. A method in accordance with claim 41 wherein said viscosity is raised at least 50 percent in step (b) to at least 50,000 cps.

44. A method in accordance with claim 26 wherein said viscosity is raised in step (b) to between approximately 50,000 to 3,000,000 cps.

45. A method in accordance with claim 26 wherein said viscosity is raised in step (b) to between approximately 50,000 to 250,000 cps.

46. A method in accordance with claim 26 wherein said impregnation bath formed in step (b) possesses a Brookfield Yield Value above the minimum value required to permanently suspend the largest particles of said high performance engineering thermoplastic polymer present in said bath.

47. A method in accordance with claim 26 wherein said impregnation of step (c) is carried out while said reinforcing filaments are immersed in said bath and said work is applied as said filaments while under tension are passed in contact with at least one solid member.

48. A method in accordance with claim 26 wherein said impregnation step (c) is carried out by passing said substantially parallel reinforcing filaments in contact with the outer surface of at least one perforated tube through which said bath is forced.

49. A method in accordance with claim 26 wherein in step (d) said concentration of aqueous medium in said resulting fibrous material is controlled within the range of approximately 10 to 70 percent by weight.

50. A method in accordance with claim 26 wherein in step (d) said resulting fibrous material is dried to remove a portion of the aqueous medium.

51. A method in accordance with claim 26 wherein in step (d) said resulting fibrous material is dried to remove at least a portion of the aqueous medium and additional aqueous medium subsequently is applied thereto in order to maintain the recited characteristics.

52. A method in accordance with claim 26 wherein the product of step (d) contains said particles of matrix-forming high performance engineering thermoplastic polymer in a concentration of approximately 6 to 45 percent by weight.

53. A method in accordance with claim 26 which further comprises the step of applying an adhesive to the impregnated fibrous material following step (d).

54. A method for the production of an improved fibrous material suitable for the formation of a substantially void-free composite article comprising a plurality of adjoining substantially parallel reinforcing filaments in association with a matrix-forming thermoplastic polymer comprising:

(a) preparing a dispersion of solid particles of a thermoplastic polymer in an aqueous medium which contains an effective amount of dissolved polyacrylic acid binding agent possessing a cross-linked molecular structure, (b) raising the pH of said aqueous medium to form an improved impregnation bath wherein the viscosity of the resulting bath is substantially increased to at least 50,000 cps. through stiffening of the molecules of said binding agent and said impregnation bath has a plastic flow characteristic with shear-thinning behavior which is sufficient to substantially uniformly suspend said particulate thermoplastic polymer within said bath, (c) impregnating said adjoining substantially parallel reinforcing filaments with said bath under conditions wherein said bath is caused to flow between said adjoining filaments by the application of work wherein said flow inherently results in a reduction of the viscosity of said bath which aids in the incorporation of said particulate thermoplastic between adjoining filaments, and (d) controlling the content of said aqueous medium in the resulting fibrous material to provide a product having said particles of matrix-forming thermoplastic polymer substantially uniformly dispersed between adjoining filaments in the absence of fusion bonding which inherently (1) is drapable and tacky at ambient conditions, (2) is handleable without segregation of said particles within the fibrous material, and (3) which upon the application of heat and pressure can be transformed into a substantially void-free fiber-reinforced composite article of a predetermined configuration wherein said solid particles form the matrix phase.

55. A method in accordance with to claim 54 wherein said plurality of adjoining substantially parallel reinforcing filaments are provided as a single end.

56. A method in accordance with claim 54 wherein said fibrous material comprises a plurality of ends each comprising a plurality of substantially parallel reinforcing filaments.

57. A method in accordance with claim 54 wherein said fibrous material is in the configuration of a cloth which incorporates a plurality of ends each comprising a plurality of substantially parallel reinforcing filaments.

58. A method in accordance with claim 54 wherein said reinforcing filaments are selected from the group consisting of carbon, glass, aramid, silicon carbide, silicon nitride, boron nitride, and mixtures of the foregoing.

59. A method in accordance with claim 54 wherein said reinforcing filaments are carbon filaments.

60. A method in accordance with claim 54 wherein said reinforcing filaments are glass filaments.

61. A method in accordance with claim 54 wherein said thermoplastic polymer is selected from the group consisting of polyethylenes, polypropylenes, polyesters, polyamides, polyvinyl chlorides, polystyrenes, polycarbonates, polyoxymethylenes, and mixtures of the foregoing.

62. A method in accordance with claim 54 wherein said solid particles of thermoplastic polymer possess a particle size within the range of approximately 0.1 to 100 microns.

63. A method in accordance with claim 54 wherein said dissolved polyacrylic acid binding agent possessing a cross-linked molecular structure has a molecular weight of approximately 450,000 to 4,000,000.

64. A method in accordance with claim 54 wherein said dissolved polyacrylic acid binding agent possessing a cross-linked molecular structure is provided in step (a) in a concentration of approximately 0.01 to 2 percent by weight based upon the total weight of the dispersion.

65. A method in accordance with claim 54 wherein said dissolved polyacrylic acid binding agent is cross-linked with polyalkenyl polyether.

66. A method in accordance with claim 54 wherein said dispersion of step (a) possesses a pH of approximately 2.5 to 3.5.

67. A method in accordance with claim 54 wherein in step (b) the pH is raised to approximately 4 to 10.

68. A method in accordance with claim 54 wherein said solid particles of said thermoplastic polymer are provided in said dispersion of step (a) in a concentration of approximately 5 to 50 percent by weight based upon the total weight of the dispersion.

69. A method in accordance with claim 54 wherein said dispersion provided in step (a) additionally includes a surfactant in a minor concentration to aid in the wetting of said particles of thermoplastic polymer.

70. A method in accordance with claim 54 wherein said viscosity is raised at least 50 percent in step (b) to at least 50,000 cps.

71. A method in accordance with claim 54 wherein said viscosity is raised in step (b) to between approximately 50,000 to 3,000,000 cps.

72. A method in accordance with claim 54 wherein said viscosity is raised in step (b) to between approximately 50,000 to 250,000 cps.

73. A method in accordance with claim 54 wherein said impregnation bath formed in step (b) possesses a Brookfield Yield Value above the minimum value required to permanently suspend the largest particles of said thermoplastic polymer present in said bath.

74. A method in accordance with claim 54 wherein said impregnation of step (c) is carried out while said reinforcing filaments are immersed in said bath and said work is applied as said filaments while under tension are passed in contact with at least one solid member.

75. A method in accordance with claim 54 wherein said impregnation step (c) is carried out by passing said substantially parallel reinforcing filaments in contact with the outer surface of at least one perforated tube through which said bath is forced.

76. A method in accordance with claim 54 wherein in step (d) said concentration of aqueous medium in said resulting fibrous material is controlled within the range of approximately 10 to 70 percent by weight.

77. A method in accordance with claim 54 wherein in step (d) said resulting fibrous material is dried to remove a portion of the aqueous medium.

78. A method in accordance with claim 54 wherein in step (d) said resulting fibrous material is dried to remove at least a portion of the aqueous medium and additional aqueous medium subsequently is applied thereto in order to maintain the recited characteristics.

79. A method in accordance with claim 54 wherein the product of step (d) contains said particles of matrix-forming thermoplastic polymer in a concentration of approximately 6 to 45 percent by weight.

80. A method in accordance with claim 54 which further comprises the step of applying an adhesive to the impregnated fibrous material following step (d).

81. A method for the production of an improved fibrous material suitable for the formation of a substantially void-free composite article comprising a plurality of adjoining substantially parallel reinforcing filaments in association with a matrix-forming high performance engineering thermoplastic polymer comprising:
  (a) preparing a dispersion of solid particles of a high performance engineering thermoplastic polymer in an aqueous medium which contains an effective amount of dissolved polyacrylic acid binding agent possessing a cross-linked molecular structure,
  (b) raising the pH of said aqueous medium to form an improved impregnation bath wherein the viscosity of the resulting bath is substantially increased to at least 50,000 cps. through stiffening of the molecules of said binding agent and said impregnation bath has a plastic flow characteristic with shear-thinning behavior which is sufficient to substantially uniformly suspend said particulate high performance engineering thermoplastic polymer within said bath,
  (c) impregnating said adjoining substantially parallel reinforcing filaments with said bath under conditions wherein said bath is caused to flow between said adjoining filaments by the application of work wherein said flow inherently results in a reduction of the viscosity of said bath which aids in the incorporation of said particulate high performance engineering thermoplastic polymer between adjoining filaments, and
  (d) controlling the content of said aqueous medium in the resulting fibrous material to provide a product having said particles of matrix-forming high performance engineering thermoplastic polymer substantially uniformly dispersed between adjoining filaments in the absence of fusion bonding which inherently (1) is drapable and tacky at ambient conditions, (2) is handleable without segregation of said particles within the fibrous material, and (3) which upon the application of heat and pressure can be transformed into a substantially void-free fiber-reinforced composite article of a predetermined configuration wherein said solid particles form the matrix phase.

82. A method in accordance with to claim 81 wherein said plurality of adjoining substantially parallel reinforcing filaments are provided as a single end.

83. A method in accordance with claim 81 wherein said fibrous material comprises a plurality of ends each comprising a plurality of substantially parallel reinforcing filaments.

84. A method in accordance with claim 81 wherein said fibrous material is in the configuration of a cloth which incorporates a plurality of ends each comprising a plurality of substantially parallel reinforcing filaments.

85. A method in accordance with claim 81 wherein said reinforcing filaments are selected from the group consisting of carbon, glass, aramid, silicon carbide, silicon nitride, boron nitride, and mixtures of the foregoing.

86. A method in accordance with claim 81 wherein said reinforcing filaments are carbon filaments.

87. A method in accordance with claim 81 wherein said reinforcing filaments are glass filaments.

88. A method in accordance with claim 81 wherein said high performance engineering thermoplastic polymer exhibits a glass transition temperature above 80° C. and a melting temperature above 150° C.

89. A method in accordance with claim 81 wherein said high performance engineering thermoplastic polymer exhibits a distinct molten phase when heated in the absence of a cross-linking agent.

90. A method in accordance with claim 81 wherein said solid particles of said high performance engineering thermoplastic polymer exhibit sintering when heated and are capable of undergoing consolidation when adjoining particles are heated under pressure.

91. A method in accordance with claim 81 wherein said high performance engineering thermoplastic polymer is selected from the group consisting of polysulfones, polyether sulfones, polyphenylene oxides, polyetherimides, anisotropic melt-forming polyesters, anisotropic melt-forming polyesteramides, anisotropic melt-forming polycarbonates, polycarbonates, polyimides, polyamideimides, polyimidesulfones, polyarylenesulfides, polyaryleneetherketones, and mixtures of the foregoing.

92. A method in accordance with claim 81 wherein said solid particles of high performance engineering thermoplastic polymer possess a particle size within the range of approximately 0.1 to 100 microns.

93. A method in accordance with claim 81 wherein said dissolved polyacrylic acid binding agent possessing a cross-linked molecular structure has a molecular weight of approximately 450,000 to 4,000,000.

94. A method in accordance with claim 81 wherein said dissolved polyacrylic acid binding agent possessing a cross-linked molecular structure is provided in step (a) in a concentration of approximately 0.01 to 2 percent by weight based upon the total weight of the dispersion.

95. A method in accordance with claim 81 wherein said dissolved polyacrylic acid binding agent is cross-linked with polyalkenyl polyether.

96. A method in accordance with claim 81 wherein said dispersion of step (a) possesses a pH of approximately 2.5 to 3.5.

97. A method in accordance with claim 81 wherein in step (b) the pH is raised to approximately 4 to 10.

98. A method in accordance with claim 81 wherein said solid particles of said high performance engineering thermoplastic polymer are provided in said dispersion of step (a) in a concentration of approximately 5 to 50 percent by weight based upon the total weight of the dispersion.

99. A method in accordance with claim 81 wherein said dispersion provided in step (a) additionally includes a surfactant in a minor concentration to aid in the wetting of said particles of said high performance engineering thermoplastic polymer.

100. A method in accordance with claim 81 wherein said viscosity is raised at least 50 percent in step (b) to at least 50,000 cps.

101. A method in accordance with claim 81 wherein said viscosity is raised in step (b) to between approximately 50,000 to 3,000,000 cps.

102. A method in accordance With claim 81 wherein said viscosity is raised in step (b) to between approximately 50,000 to 250,000 cps.

103. A method in accordance with claim 81 wherein said impregnation bath formed in step (b) possesses a Brookfield Yield Value above the minimum value required to permanently suspend the largest particles of said high performance engineering thermoplastic polymer present in said bath.

104. A method in accordance with claim 81 wherein said impregnation of step (c) is carried out while said reinforcing filaments are immersed in said bath and said work is applied as said filaments while under tension are passed in contact with at least one solid member.

105. A method in accordance with claim 81 wherein said impregnation step (c) is carried out by passing said substantially parallel reinforcing filaments in contact with the outer surface of at least one perforated tube through which said bath is forced.

106. A method in accordance with claim 81 wherein in step (d) said concentration of aqueous medium in said resulting fibrous material is controlled within the range of approximately 10 to 70 percent by weight.

107. A method in accordance with claim 81 wherein in step (d) said resulting fibrous material is dried to remove a portion of the aqueous medium.

108. A method in accordance with claim 81 wherein in step (d) said resulting fibrous material is dried to remove at least a portion of the aqueous medium and additional aqueous medium subsequently is applied thereto in order to maintain the recited characteristics.

109. A method in accordance with claim 81 wherein the product of step (d) contains said particles of matrix-forming high performance engineering thermoplastic polymer in a concentration of approximately 6 to 45 percent by weight.

110. A method in accordance with claim 81 which further comprises the step of applying an adhesive to the impregnated fibrous material following step (d).

111. A method for the production of an improved fibrous material suitable for the formation of a substantially void-free composite article comprising a plurality of adjoining substantially parallel reinforcing filaments in association with a matrix-forming thermoplastic polymer comprising:

(a) providing a plurality of reinforcing fibrous tows each comprising a plurality of adjoining substantially parallel filaments, (b) preparing a dispersion of solid particles of thermoplastic polymer in an aqueous medium which contains an effective amount of dissolved polyacrylic acid binding agent possessing a cross-linked molecular structure, (c) raising the pH of said aqueous medium to form an improved impregnation bath wherein the viscosity of the resulting bath is substantially increased to at least 50,000 cps. through the stiffening of the molecules of said binding agent and said impregnation bath has a plastic flow characteristic with shear-thinning behavior which is sufficient to substantially uniformly suspend said particulate thermoplastic polymer within said bath, (d) situating said resulting bath within an impregnation apparatus, (e) aligning said reinforcing fibrous tows in a side-by-side relationship to form a substantially uniform sheet-like tape, (f) feeding said sheet-like tape to said impregnation apparatus, (g) impregnating said substantially uniform sheet-like tape with said bath while present in said impregnation apparatus under conditions wherein said bath is caused to flow between said adjoining filaments of said sheet-like tape by the application of work wherein said flow inherently results in a reduction of the viscosity of said bath which aids in the incorporation of said particulate thermoplastic polymer between adjoining filaments, and (h) controlling the content of said aqueous medium in the resulting sheet-like tape to provide a product having said particles of said matrix-forming thermoplastic polymer substantially uniformly dispersed between adjoining filaments in the absence of fusion bonding which inherently (1) is drapable and tacky at ambient conditions, (2) is handleable without segregation of said particles, and (3) which upon the application of heat and pressure can be transformed into a substantially void-free fiber-reinforced composite article of a predetermined configuration wherein said solid particles form the matrix phase.

112. A method in accordance with claim 111 wherein said reinforcing fibrous tows are selected from the group consisting of carbon, glass, aramid, silicon carbide, silicon nitride, boron nitride, and mixtures of the foregoing.

113. A method in accordance with claim 111 wherein said reinforcing fibrous tows comprise carbon filaments.

114. A method in accordance with claim 111 wherein said reinforcing fibrous tows comprise glass filaments.

115. A method in accordance with claim 111 wherein said thermoplastic polymer is selected from the group consisting of polyethylenes, polypropylenes, polyesters, polyamides, polyvinyl chlorides, polystyrenes, polycarbonates, polyoxymethylenes, and mixtures of the foregoing.

116. A method in accordance with claim 111 wherein said solid particles of thermoplastic polymer possess a particle size within the range of approximately 0.1 to 100 microns.

117. A method in accordance with claim 111 wherein said dissolved polyacrylic acid binding agent possessing a cross-linked molecular structure has a molecular weight of approximately 450,000 to 4,000,000.

118. A method in accordance with claim 104 wherein said dissolved polyacrylic acid binding agent possessing a cross-linked molecular structure is provided in step (a) in a concentration of approximately 0.01 to 2 percent by weight based upon the total weight of the dispersion.

119. A method in accordance with claim 104 wherein said dissolved polyacrylic acid binding agent is cross-linked with polyalkenyl polyether.

120. A method in accordance with claim 104 wherein said dispersion of step (b) possesses a pH of approximately 2.5 to 3.5.

121. A method in accordance with claim 104 wherein in step (c) the pH is raised to approximately 4 to 10.

122. A method in accordance with claim 104 wherein said solid particles of said thermoplastic polymer are provided in said dispersion of step (b) in a concentration of approximately 5 to 50 percent by weight based upon the total weight of the dispersion.

123. A method in accordance with claim 104 wherein said dispersion provided in step (b) additionally includes a surfactant in a minor concentration to aid in the wetting of said particles of said thermoplastic polymer.

124. A method in accordance with claim 104 wherein said viscosity is raised at least 50 percent in step (c) to at least 50,000 cps.

125. A method in accordance with claim 111 wherein said viscosity is raised in step (c) to between approximately 50,000 to 3,000,000 cps.

126. A method in accordance with claim 111 wherein said viscosity is raised in step (c) to between approximately 50,000 to 250,000 cps.

127. A method in accordance with claim 111 wherein said impregnation bath formed in step (c) possesses a Brookfield Yield Value above the minimum value required to permanently suspend the largest particles of said thermoplastic polymer present in said bath.

128. A method in accordance with claim 111 wherein said impregnation of step (g) is carried out while said substantially uniform sheet-like tape is immersed in said bath and said work is applied as said filaments while under tension are passed in contact with at least one solid member.

129. A method in accordance with claim 111 wherein said impregnation step (g) is carried out by passing said substantially uniform sheet-like tape in contact with the outer surface of at least one perforated tube through which said bath is forced.

130. A method in accordance with claim 111 wherein in step (h) said concentration of aqueous medium in said resulting sheet-like tape is controlled within the range of approximately 10 to 70 percent by weight.

131. A method in accordance with claim 111 wherein in step (h) said resulting sheet-like tape is dried to remove a portion of the aqueous medium.

132. A method in accordance with claim 111 wherein in step (h) said resulting sheet-like tape is dried to remove at least a portion of the aqueous medium and additional aqueous medium subsequently is applied thereto in order to maintain the recited characteristics.

133. A method in accordance with claim 111 wherein the product of step (h) contains said particles of matrix-forming thermoplastic polymer in a concentration of approximately 6 to 45 percent by weight.

134. A method in accordance with claim 104 which further comprises the step of applying an adhesive to the impregnated sheet-like tape following step (h).

135. A method for the production of an improved fibrous material suitable for the formation of a substantially void-free composite article comprising a plurality of adjoining substantially parallel reinforcing filaments in association with a matrix-forming high performance engineering thermoplastic polymer comprising:
  (a) providing a plurality of reinforcing fibrous tows each comprising a plurality of adjoining substantially parallel filaments,
  (b) preparing a dispersion of solid particles of a high performance engineering thermoplastic polymer in an aqueous medium which contains an effective amount of dissolved polyacrylic acid binding agent possessing a cross-linked molecular structure,
  (c) raising the pH of said aqueous medium to form an improved impregnation bath wherein the viscosity of the resulting bath is substantially increased to at least 50,000 cps. through the stiffening of the molecules of said binding agent and said impregnation bath has a plastic flow characteristic with shear-thinning behavior which is sufficient to substantially uniformly suspend said particulate high performance engineering thermoplastic polymer within said bath,
  (d) situating said resulting bath within an impregnation apparatus,
  (e) aligning said reinforcing fibrous tows in a side-by-side relationship to form a substantially uniform sheet-like tape,
  (f) feeding said sheet-like tape to said impregnation apparatus,
  (g) impregnating said substantially uniform sheet-like tape with said bath while present in said impregnation apparatus under conditions wherein said bath is caused to flow between said adjoining filaments of said sheet-like tape by the application of work wherein said flow inherently results in a reduction of the viscosity of said bath which aids in the incorporation of said particulate high performance engineering thermoplastic polymer between adjoining filaments, and
  (h) controlling the content of said aqueous medium in the resulting sheet-like tape to provide a product having said particles of said matrix-forming high performance engineering thermoplastice polymer substantially uniformly dispersed between adjoining filaments in the absence of fusion bonding which inherently (1) is drapable and tacky at ambient conditions, (2) is handleable without segregation of said particles, and (3) which upon the application of heat and pressure can be transformed into a substantially void-free fiber-reinforced composite article of a predetermined configuration wherein said solid particles form the matrix phase.

136. A method in accordance with claim 126 wherein said reinforcing fibrous tows are selected from the group consisting of carbon, glass, aramid, silicon carbide, silicon nitride, boron nitride, and mixtures of the foregoing.

137. A method in accordance with claim 126 wherein said reinforcing fibrous tows comprise carbon filaments.

138. A method in accordance with claim 126 wherein said reinforcing fibrous tows comprise glass filaments.

139. A method in accordance with claim 126 wherein said high performance engineering thermoplastic polymer exhibits a glass transition temperature above 80° C. and a melting temperature above 150° C.

140. method in accordance with claim 126 wherein said high performance engineering thermoplastic polymer exhibits a distinct molten phase when heated in the absence of a cross-linking agent.

141. A method in accordance with claim 135 wherein said solid particles of said high performance engineering thermoplastic polymer exhibit sintering when heated and are capable of undergoing consolidation when adjoining particles are heated under pressure.

142. A method in accordance with claim 135 wherein said high performance engineering thermoplastic polymer is selected from the group consisting of polysulfones, polyether sulfones, polyphenylene oxides, polyetherimides, anisotropic melt-forming polyesters, anisotropic melt-forming polyesteramides, anisotropic melt-forming polycarbonates, polycarbonates, polyimides, polyamideimides, polyimidesulfones, polyarylenesulfides, polyarylneetherketones, and mixtures of the foregoing.

143. A method in accordance with claim 135 wherein said solid particles of said high performance engineering thermoplastic polymer possess a particle size within the range of approximately 0.1 to 100 microns.

144. A method in accordance with claim 135 wherein said dissolved polyacrylic acid binding agent possessing a cross-linked molecular structure has a molecular weight of approximately 450,000 to 4,000,000.

145. A method in accordance with claim 135 wherein said dissolved polyacrylic acid binding agent possessing a cross-linked molecular structure is provided in step (a) in a concentration of approximately 0.01 to 2 percent by weight based upon the total weight of th dispersion.

146. A method in accordance with claim 135 wherein said dissolved polyacrylic acid binding agent is cross-linked with polyalkenyl polyether.

147. A method in accordance with claim 135 wherein said dispersion of step (b) possesses a pH of approximately 2.5 to 3.5.

148. A method in accordance with claim 135 wherein in step (c) the pH is raised to approximately 4 to 10.

149. A method in accordance with claim 135 wherein said solid particles of said high performance engineering thermoplastic polymer are provided in said dispersion of step (b) in a concentration of approximately 5 to 50 percent by weight based upon the total weight of the dispersion.

150. A method in accordance with claim 135 wherein said dispersion provided in step (b) additionally includes a surfactant in a minor concentration to aid in the wetting of said particles of said high performance engineering thermoplastic polymer.

151. A method in accordance with claim 135 wherein said viscosity is raised at least 50 percent in step (c) to at least 50,000 cps.

152. A method in accordance with claim 135 wherein said viscosity is raised in step (c) to between approximately 50,000 to 3,000,000 cps.

153. A method in accordance with claim 135 wherein said viscosity is raised in step (c) to between approximately 50,000 to 250,000 cps.

154. A method in accordance with claim 135 wherein said impregnation bath formed in step (c) possesses a Brookfield Yield Value above the minimum value required to permanently suspend the largest particles of said high performance engineering thermoplastic polymer present in said bath.

155. A method in accordance with claim 135 wherein said impregnation of step (g) is carried out while said substantially uniform sheet-like tape is immersed in said bath and said work is applied as said filaments while under tension are passed in contact with at least one solid member.

156. A method in accordance with claim 135 wherein said impregnation step (g) is carried out by passing said substantially uniform sheet-like tape in contact with the outer surface of at least one perforated tube through which said bath is forced.

157. A method in accordance with claim 135 wherein in step (h) said concentration of aqueous medium in said resulting sheet-like tape is controlled within the range of approximately 10 to 70 percent by weight.

158. A method in accordance with claim 135 wherein in step (h) said resulting sheet-like tape is dried to remove a portion of the aqueous medium.

159. A method in accordance with claim 135 wherein in step (h) said resulting sheet-like tape is dried to remove at least a portion of the aqueous medium and additional aqueous medium subsequently is applied thereto in order to maintain the recited characteristics.

160. A method in accordance with claim 135 wherein the product of step (h) contains said particles of matrix-forming high performance engineering thermoplastic polymer in a concentration of approximately 6 to 45 percent by weight.

161. A method in accordance with claim 126 which further comprises the step of applying an adhesive to the impregnated sheet-like tape following step (h).

* * * * *